United States Patent
Penteroudakis et al.

[19]

[11] Patent Number: 5,995,922
[45] Date of Patent: Nov. 30, 1999

[54] IDENTIFYING INFORMATION RELATED TO AN INPUT WORD IN AN ELECTRONIC DICTIONARY

[75] Inventors: Joseph E. Penteroudakis, Seattle; Steve Richardson, Redmond, both of Wash.

[73] Assignee: Microsoft Corporation, Redmond, Wash.

[21] Appl. No.: 08/641,804

[22] Filed: May 2, 1996

[51] Int. Cl.$^6$ .................................................. G06K 9/00
[52] U.S. Cl. .................. 704/9; 704/10; 707/532
[58] Field of Search .................. 704/1, 9, 10; 707/530, 707/532

[56] References Cited

U.S. PATENT DOCUMENTS

| | | | |
|---|---|---|---|
| 4,355,370 | 10/1982 | Yanagiuchi | 364/900 |
| 4,420,817 | 12/1983 | Yoshida | 364/900 |
| 4,674,066 | 6/1987 | Kucera | 704/1 |
| 5,490,061 | 2/1996 | Tolin et al. | 364/419.02 |
| 5,623,406 | 4/1997 | Ichbiah | 395/753 |
| 5,734,749 | 3/1998 | Yamada et al. | 382/187 |

FOREIGN PATENT DOCUMENTS

| | | | |
|---|---|---|---|
| 62-082466 | 4/1987 | Japan | G06F 15/38 |

OTHER PUBLICATIONS

Sampson, G., "How Fully Does a Machine–Usable Dictionary Cover English Text?", *Literary and Linguistic Computing* 4(1): 29–35, 1989 (abstract only).

Jensen, Karen et al. (eds.), Microsoft Corporation, *Natural Language Processing: The PLNLP Approach,* Kluwer Academic Publishers, Boston, 1993, pp. 1–11, 203–214, and 273–284.

Garside, Roger et al., "The Computational analysis of English: A Corpus–Based Approach", *Longman,* pp. 96–109 (1987).

*Primary Examiner*—Forester W. Isen
*Assistant Examiner*—Patrick N. Edouard
*Attorney, Agent, or Firm*—Seed and Berry LLP

[57] ABSTRACT

A method and system for retrieving information from an electronic dictionary. The system stores all information about words that have the same normalized form into a single entry within the electronic dictionary. The normalized form of a word has all lower case letters and no diacritical marks. When information is to be retrieved from the dictionary for a word, the word is first normalized and then the dictionary is searched for the entry corresponding to that normalized word. The entry that is found contains the information for that word.

11 Claims, 32 Drawing Sheets

*the* — 203
{
 Adj — 204
  {Lemma — 205   "the"
   Bits        Sing Plur Wa6 Det Art
               B0 Def} — 206
 Adv — 212
  {Lemma      "the"
   Bits       Wa5}

Senses — 207
  {Bits — 208   Sing Plur Wa6 Closed
                Det Art Def
   Lemma      "the"
   Cat        Adj
   Infl       Adj-nil
   Defin      "used when it is clearly understood who or what is meant"
   Exs        "We have a cat and a dog. The cat (= our cat) is black and the dog
              (= our dog) white."
              "the history of China (= Chinese history)"
              "The Danes that I know work very hard."
              "Take these letters to the post office (it is understood that you know
              which post office and where it is)"} — 209
210
  {Lemma      "the"
   Cat        Adv
   Defin      "To that extent; by that much"
   Exs        "the sooner the better."} — 211

(more sense records) — 213
}

---

*person*
{
 Noun
  {Lemma      "person"
   Bits       Pers3 Sing Humn Mass
              Anim Count Conc C9
              Humn_sr
   Infl       Noun-default}
 Senses
  {Lemma      "person"
   Cat        Noun
   Defin      "A living human being."
   Exs        "chairperson"
              "spokesperson"
              "salesperson."}

(more sense records)
}

*(Prior Art) Fig. 2*

```
whom
{
  Pron
            {Lemma    "who"
             Bits     Pers3 Sing Plur Rel Wh
                      Humn Obj Anim}
  Senses
            {Lemma    "who"
             Bits     Pers3 Sing Plur Rel Wh
                      Closed Humn Obj Anim
             Cat      Pron
             Defin    "(the object form of who, used esp. in writing and careful speech)"
             Exs      "With whom?"
                      "The man with whom he talked."
                      "You saw whom?"
                      "Whom did they see?"
                      "the man (whom) they saw arriving"
                      "a man (whom) you may know of"}
            (more sense records)
} i
{
  Noun
            {Lemma    "i"
             Bits     Pers3 Sing TakesAn
             Infl     Noun-irreg}
  Pron
            {Lemma    "I"
             Bits     Sing Nom TakesAn Pers1
                      Humn Anim LexCap}
  Senses
            {Lemma    "i"
             Cat      Noun
             Infl     Noun-irreg
             Defin    "The ninth letter of the modern English alphabet."}

{Lemma    "I"
             Cat      Pron
             Defin    "Used to refer to oneself as speaker or writer."}
            (more sense records)
} met
{
  Verb
            {Lemma    "meet"
             Bits     Sing Plur Past
                      Pastpart
             Infl     Verb-meet}
  Senses
            {Lemma    "meet"
             Bits     Past Pastpart
             Cat      Verb}
}
```

*(Prior Art) Fig. 3*

```
was
{
  Verb
          {Lemma    "be"
           Bits     Pers3 Sing Past Pers1
           Infl     Verb-be } }

Senses
          {Lemma    "be"
           Bits     Past Pastpart
           Cat      Verb}

(more sense records)
}
```

```
my
{
  Adj
          {Lemma    "I"
           Bits     Wa5 Det Poss Pers1 Def
                    Gen A0
           Infl     Adj-none }

Ij      {Lemma    "my } }

Senses
          {Lemma    "I"
           Bits     Wa5 Closed Det Poss
                    Pers1 Def Gen A0
           Cat      Adj
           Infl     Adj-none
           Defin    "belonging to me"
           Exs      "my car"
                    "my mother"}

{Cat      Ij
           Defin    "Used as an exclamation of surprise, pleasure, or dismay"
           Exs      "Oh, my! What a tiring day!"}

(more sense records)
}
```

*(Prior Art) Fig. 4*

*friend*
{
  Noun
        {Lemma     "friend"
        Bits       Pers3 Sing Humn Anim
                    Count Conc Humn_sr N0
                    Wrdy
        Infl       Noun-default
        Vprp      (of to)
        Bitrecs
            {Bits       Humn Count Conc
            Vprp      (of) }

{Bits       Humn Count Conc
            Vprp      (to) } }

Verb
        {Lemma     "friend"
        Bits       Inf Plur Pres T1
        Infl       Verb-default } }

Senses
        {Lemma     "friend"
        Bits       Humn Conc
        Cat        Noun
        Defin      "A person whom one knows, likes, and trusts."}

{Bits       T1
        Lemma     "friend"
        Cat        Verb
        Infl       Verb-default
        Defin      "To befriend."}

*(more sense records)*
}

(Prior Art) Fig. 5

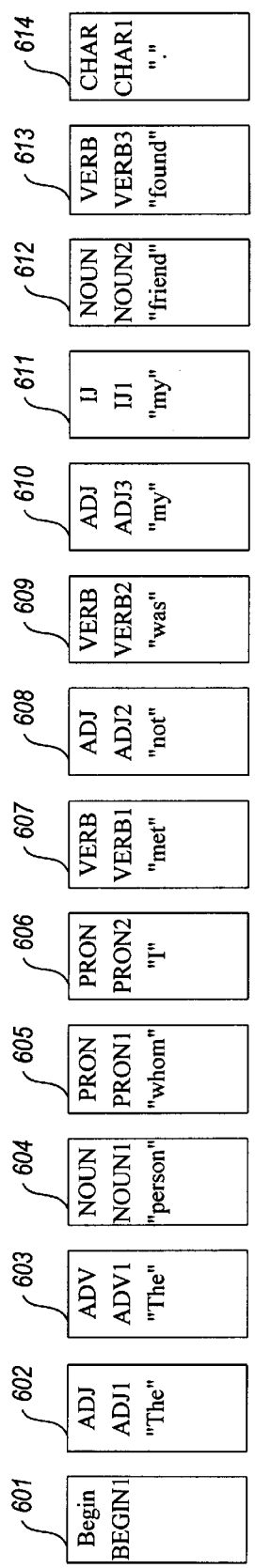
(Prior Art) Fig. 6

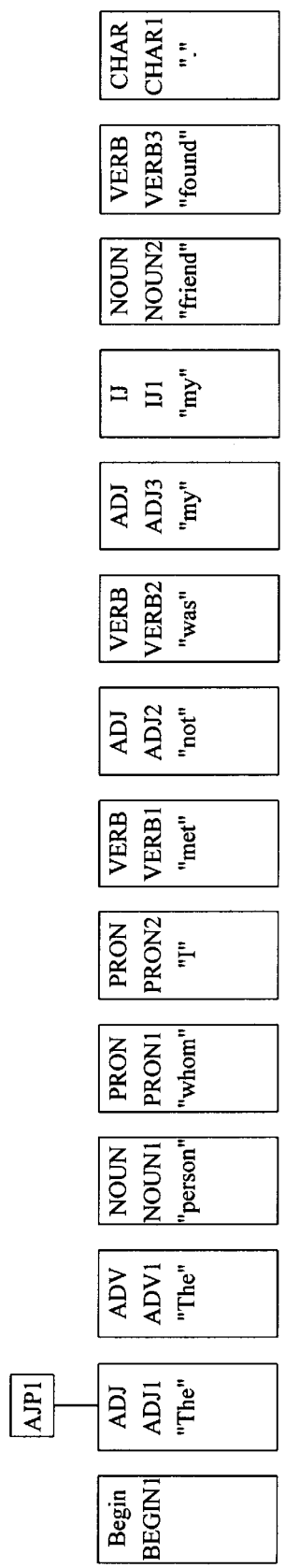
(Prior Art) Fig. 7

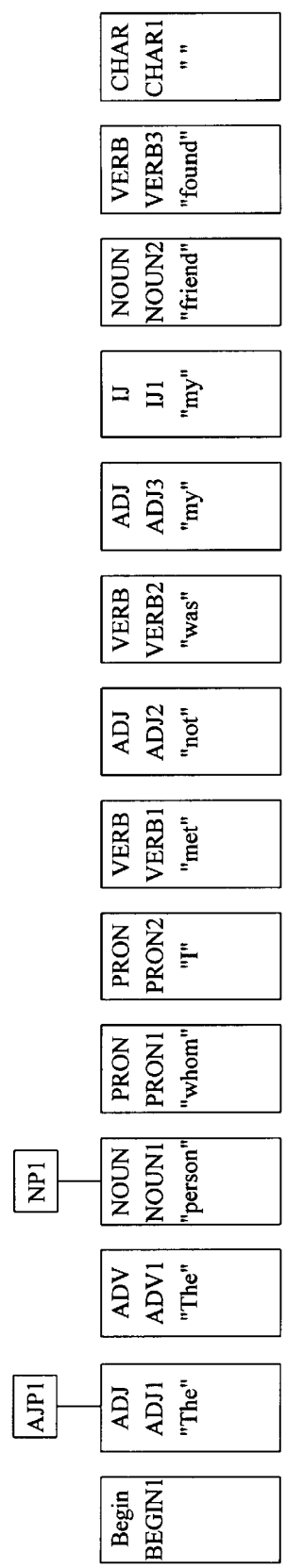
(Prior Art) Fig. 8

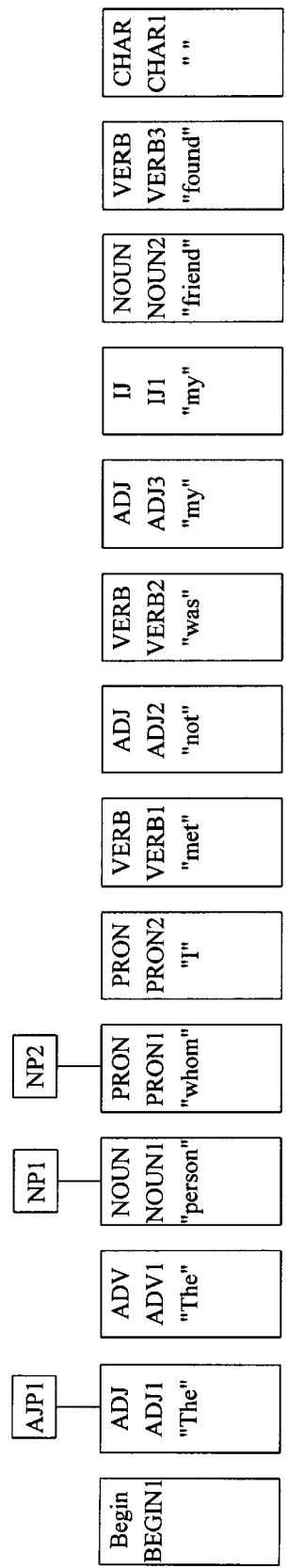
*(Prior Art) Fig. 9*

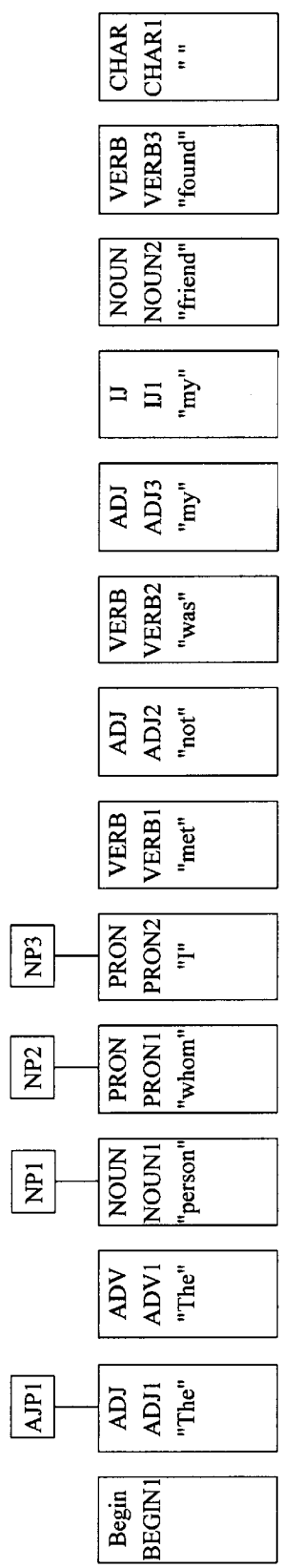
(Prior Art) Fig. 10

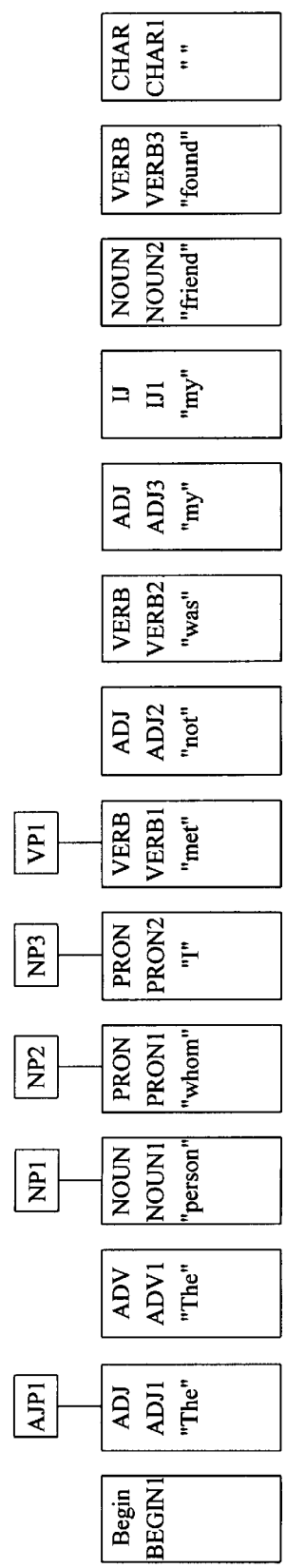
(Prior Art) Fig. 11

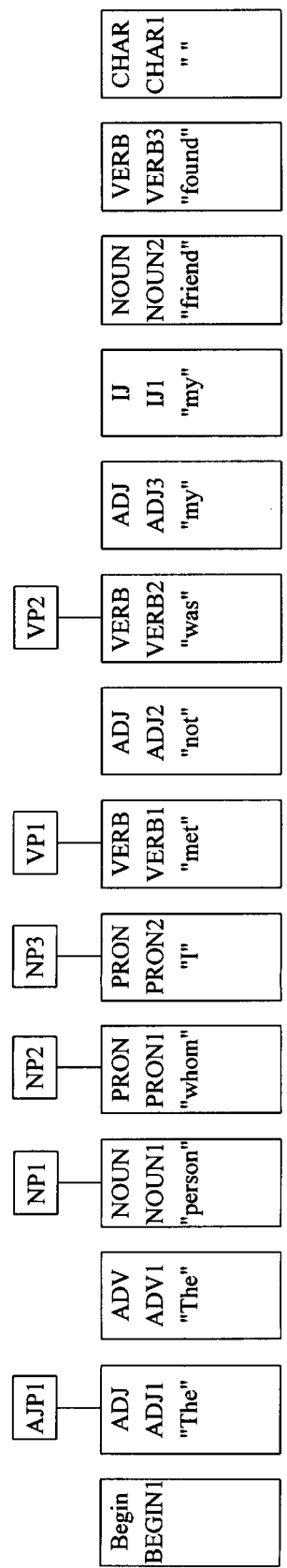
(Prior Art) Fig. 12

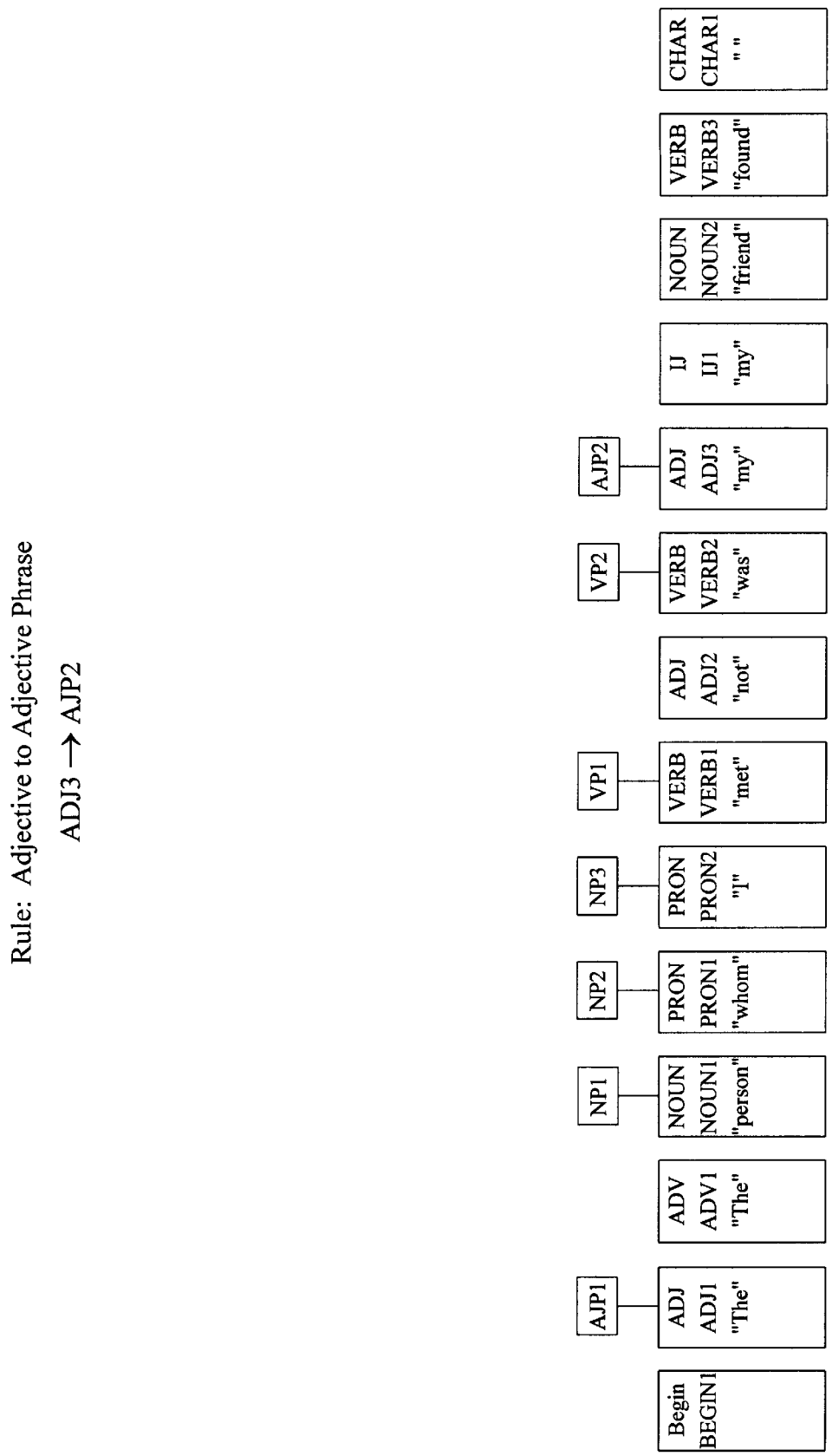
(Prior Art) Fig. 13

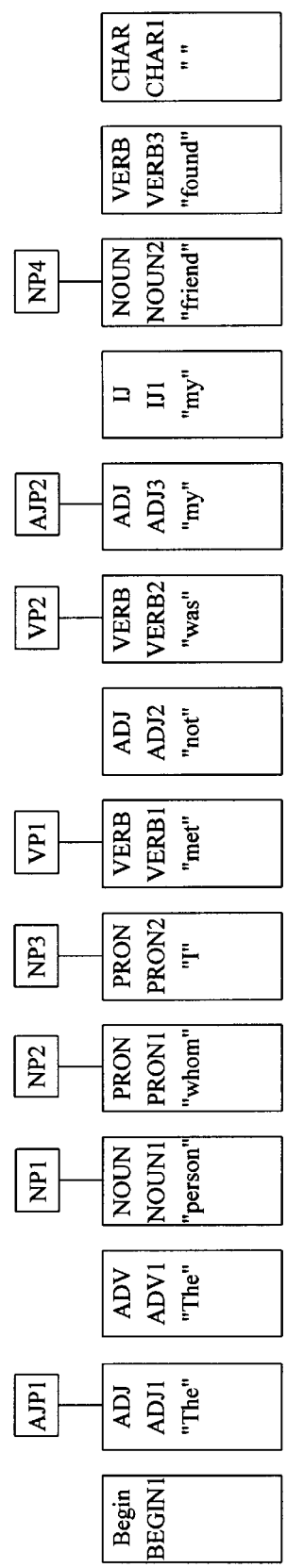
Rule: Noun to Noun Phrase
(Prior Art) Fig. 14

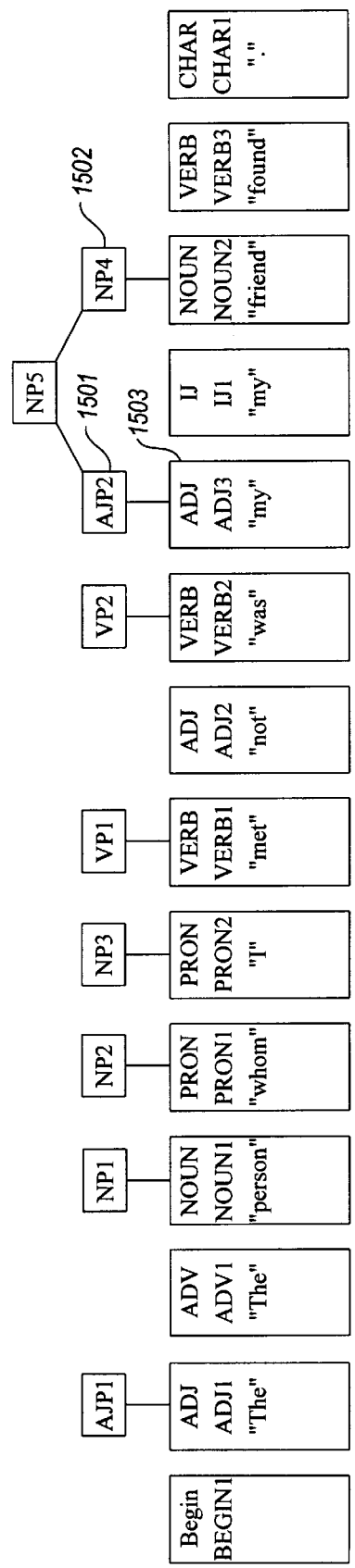
*(Prior Art) Fig. 15*

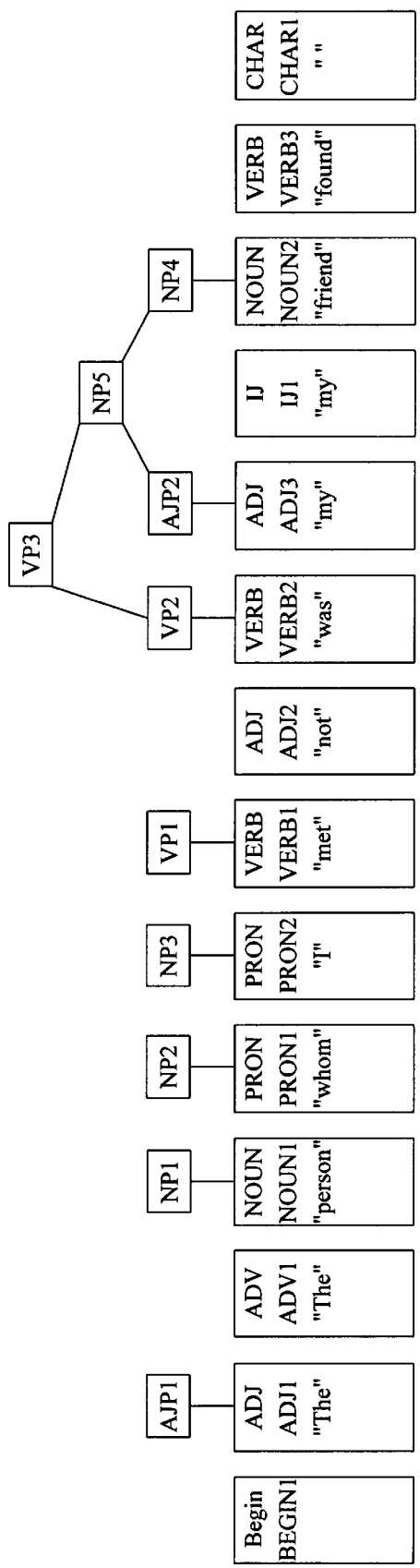
Rule: Verb Phrase with Noun Phrase as Object of Transitive Verb
VP2, NP5 → VP3
(Prior Art) Fig. 16

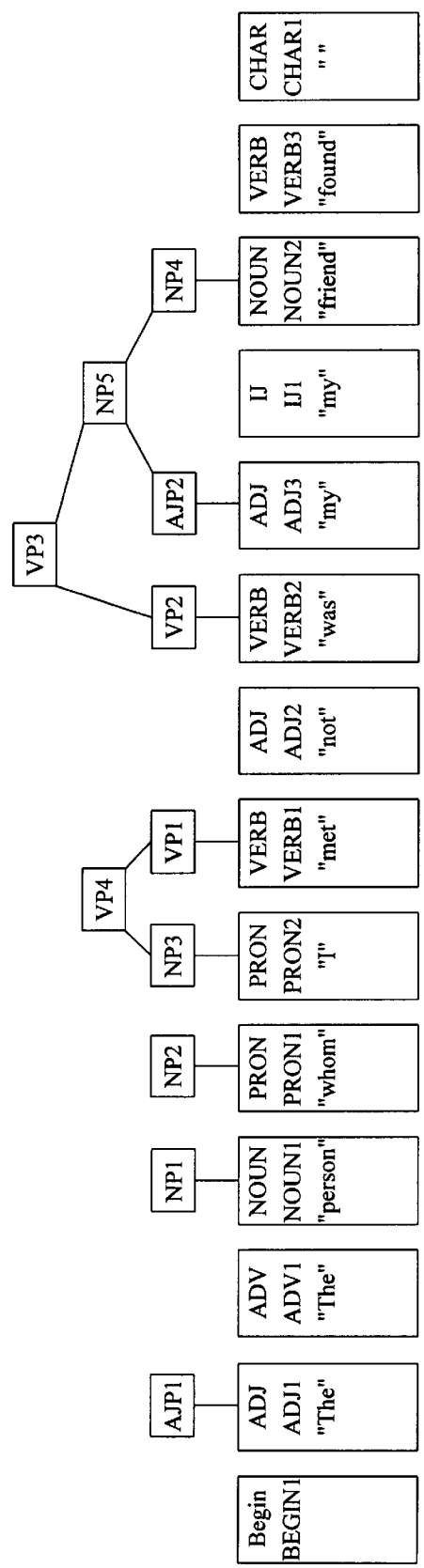
*(Prior Art) Fig. 17*

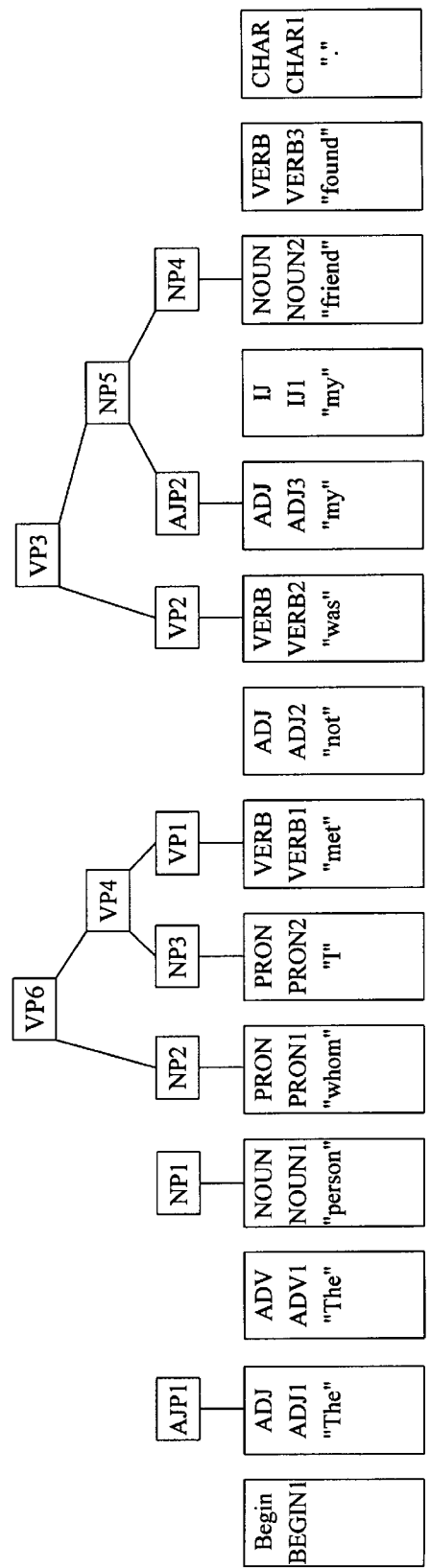
*(Prior Art) Fig. 18*

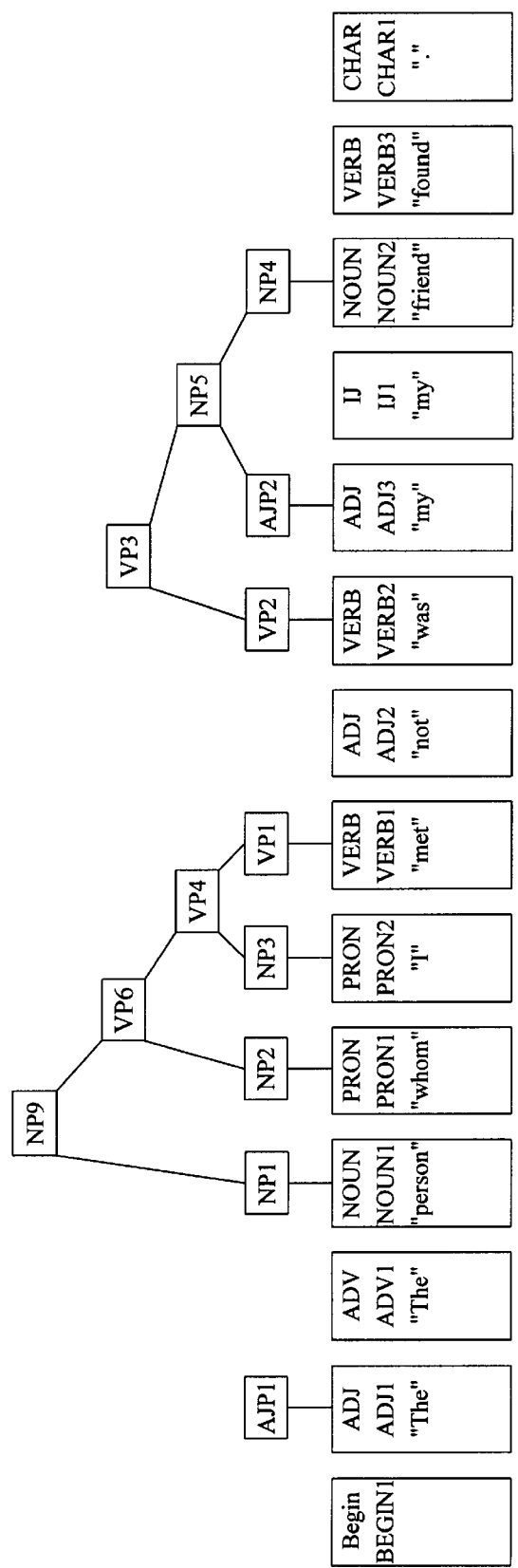
(Prior Art) Fig. 19

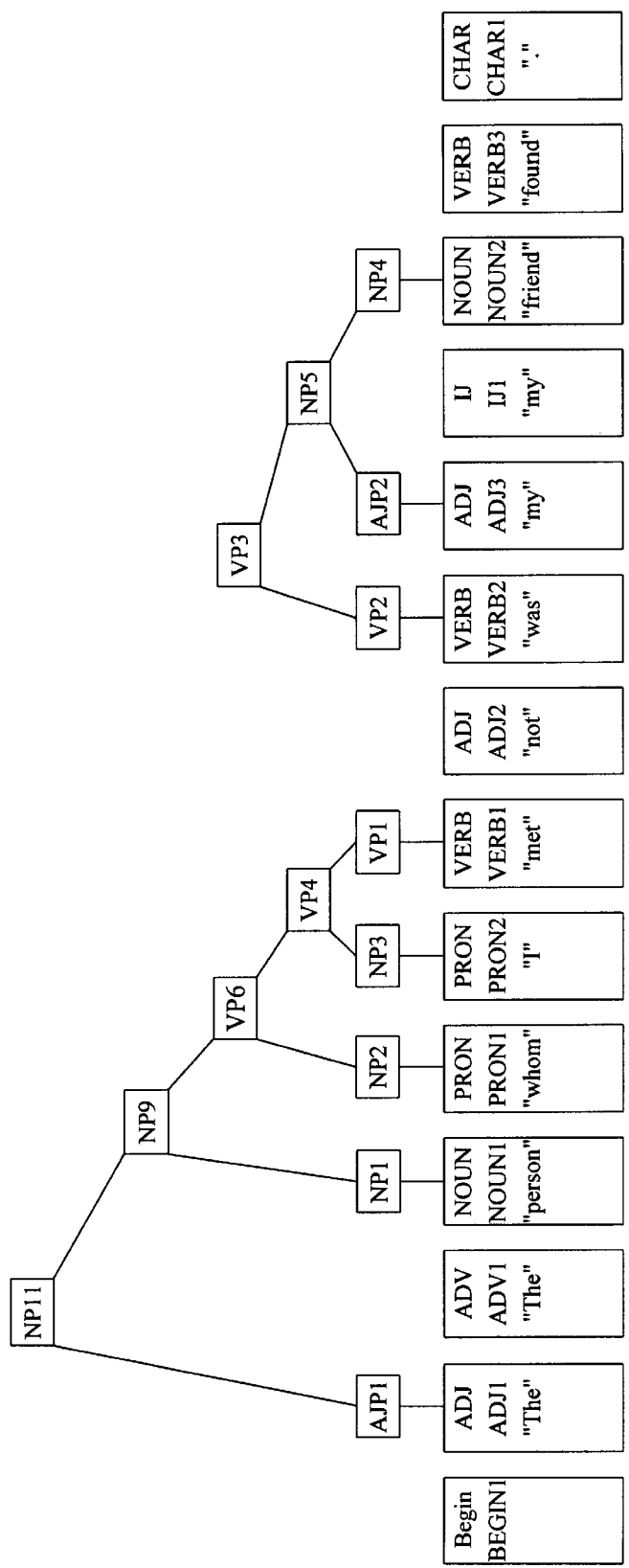
(Prior Art) Fig. 20

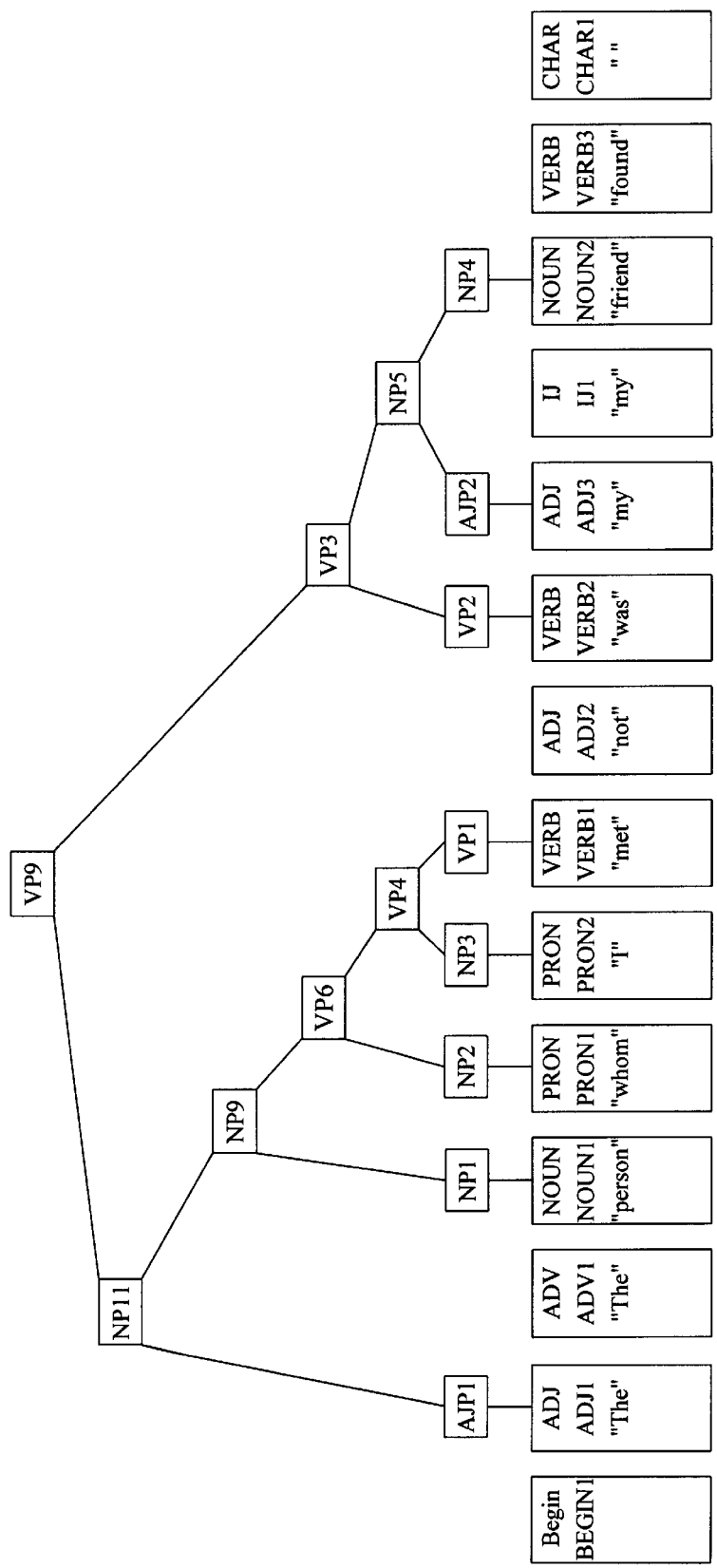
(Prior Art) Fig. 21

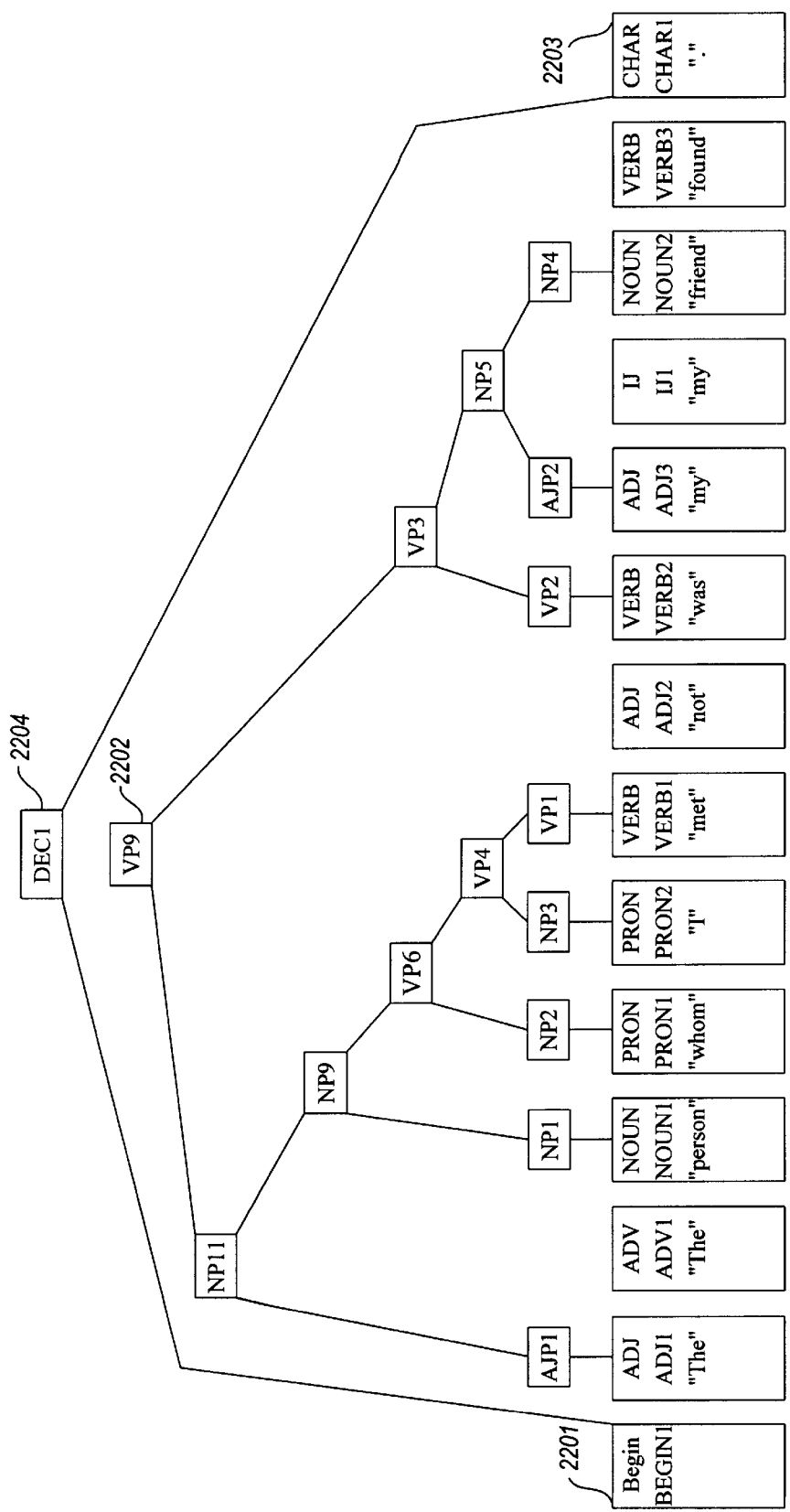
*(Prior Art) Fig. 22*

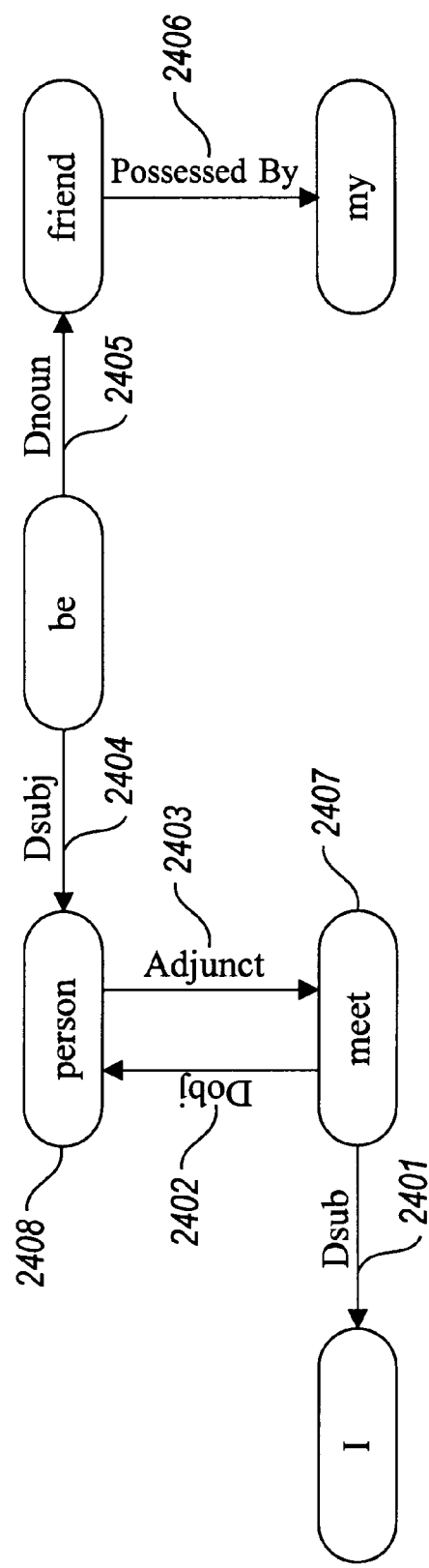
*(Prior Art) Fig. 23*

```
building ─── 2802
{
  Noun ─── 2801
      {Lemma      "building"
      Bits        Pers3 Sing Mass N_ing
                  Count Conc
      Infl        Noun-default }
  Senses
      {Bits       Count Conc
      Lemma       "building"
      Cat         Noun
      Infl        Noun-default
      Defin       "something usu. with a roof and walls that is intended to stay in one
                  place and not to be moved or taken down again"
      Exs         "Houses and churches are buildings" } }

(more sense records, but no verb record)
}
```

*Fig. 28*

```
building
{
  Noun ─── 2902  ─ 2901
      {Lemma      "building"
      Bits        Pers3 Sing Mass N_ing
                  Count Conc
      Infl        Noun-default }
  Verb ─── 2904  ─ 2903
      {Lemma      "build"
      Bits        Prespart
      Infl        Verb-build }
  Senses
      {Bits       Count Conc
      Lemma       "building"
      Cat         Noun
      Infl        Noun-default
      Defin       "something usu. with a roof and walls that is intended to stay in one
                  place and not to be moved or taken down again"
      Exs         "Houses and churches are buildings" } }

{Lemma      "build"
      Bits        Prespart
      Cat         Verb
      Infl        Verb-build }

(more sense records)
}
```

*Fig. 29*

IDENTIFYING INFORMATION RELATED TO AN INPUT WORD IN AN ELECTRONIC DICTIONARY

TECHNICAL FIELD

The present invention relates to the field of natural language processing ("NLP"), and more particularly, to a method and system for organizing and retrieving information from an electronic dictionary.

BACKGROUND OF THE INVENTION

Natural Language Processing

Computer systems for automatic natural language processing use a variety of subsystems, roughly corresponding to the linguistic fields of morphological, syntactic, and semantic analysis to analyze input text and achieve a level of machine understanding of natural language. Having understood the input text to some level, a computer system can, for example, suggest grammatical and stylistic changes to the input text, answer questions posed in the input text, or effectively store information represented by the input text.

Morphological analysis identifies input words and provides information for each word that a human speaker of the natural language could determine by using a dictionary. Such information might include the syntactic roles that a word can play (e.g., noun or verb) and ways that the word can be modified by adding prefixes or suffixes to generate different, related words. For example, in addition to the word "fish," the dictionary might also list a variety of words related to, and derived from, the word "fish," including "fishes," "fished," "fishing," "fisher," "fisherman," "fishable," "fishability," "fishbowl," "fisherwoman," "fishery," "fishhook," "fishnet," and "fishy."

Syntactic analysis analyzes each input sentence, using, as a starting point, the information provided by the morphological analysis of input words and the set of syntax rules that define the grammar of the language in which the input sentence was written. The following are sample syntax rules:

sentence=noun phrase+verb phrase noun phrase=adjective+noun verb phrase=adverb+verb Syntactic analysis attempts to find an ordered subset of syntax rules that, when applied to the words of the input sentence, combine groups of words into phrases, and then combine phrases into a complete sentence. For example, consider the input sentence: "Big dogs fiercely bite." Using the three simple rules listed above, syntactic analysis would identify the words "Big" and "dogs" as an adjective and noun, respectively, and apply the second rule to generate the noun phrase "Big dogs." Syntactic analysis would identify the words "fiercely" and "bite" as an adverb and verb, respectively, and apply the third rule to generate the verb phrase "fiercely bite." Finally, syntactic analysis would apply the first rule to form a complete sentence from the previously generated noun phrase and verb phrase. An ordered set of rules and the phrases that result from applying them, including a final complete sentence, is called a parse.

Some sentences, however, can have several different parses. A classic example sentence for such multiple parses is: "Time flies like an arrow." There are at least three possible parses corresponding to three possible meanings of this sentence. In the first parse, "time" is the subject of the sentence, "flies" is the verb, and "like an arrow" is a prepositional phrase modifying the verb "flies." However, there are at least two unexpected parses as well. In the second parse, "time" is an adjective modifying "flies," "like" is the verb, and "an arrow" is the object of the verb. This parse corresponds to the meaning that flies of a certain type, "time flies," like or are attracted to an arrow. In the third parse, "time" is an imperative verb, "flies" is the object, and "like an arrow" is a prepositional phrase modifying "time." This parse corresponds to a command to time flies as one would time an arrow, perhaps with a stopwatch.

Syntactic analysis is often accomplished by constructing one or more hierarchical trees called syntax parse trees. Each leaf node of the syntax parse tree represents one word of the input sentence. The application of a syntax rule generates an intermediate-level node linked from below to one, two, or occasionally more existing nodes. The existing nodes initially comprise only leaf nodes, but, as syntactic analysis applies syntax rules, the existing nodes comprise both leaf nodes as well as intermediate-level nodes. A single root node of a complete syntax parse tree represents an entire sentence.

Semantic analysis generates a logical form graph that describes the meaning of input text in a deeper way than can be described by a syntax parse tree alone. Semantic analysis first attempts to choose the correct parse, represented by a syntax parse tree, if more than one syntax parse tree was generated by syntactic analysis. The logical form graph corresponding to the correct parse is a first attempt to understand the input text at a level analogous to that achieved by a human speaker of the language.

The logical form graph has nodes and links, but, unlike the syntax parse tree described above, is not hierarchically ordered. The links of the logical form graph are labeled to indicate the relationship between a pair of nodes. For example, semantic analysis may identify a certain noun in a sentence as the deep subject or deep object of a verb. The deep subject of a verb is the doer of the action and the deep object of a verb is the object of the action specified by the verb. The deep subject of an active voice verb may be the syntactic subject of the sentence, and the deep object of an active voice verb may be the syntactic object of the verb. However, the deep subject of a passive voice verb may be expressed in an instrumental clause, and the deep object of a passive voice verb may be the syntactic subject of the sentence. For example, consider the two sentences: (1) "Dogs bite people" and (2) "People are bitten by dogs." The first sentence has an active voice verb, and the second sentence has a passive voice verb. The syntactic subject of the first sentence is "Dogs" and the syntactic object of the verb "bite" is "people." By contrast, the syntactic subject of the second sentence is "People" and the verb phrase "are bitten" is modified by the instrumental clause "by dogs." For both sentences, "dogs" is the deep subject, and "people" is the deep object of the verb or verb phrase of the sentence. Although the syntax parse trees generated by syntactic analysis for sentences 1 and 2, above, will be different, the logical form graphs generated by semantic analysis will be the same, because the underlying meaning of the two sentences is the same.

Further semantic processing after generation of the logical form graph may draw on knowledge databases to relate analyzed text to real world concepts in order to achieve still deeper levels of understanding. An example knowledge base would be an on-line encyclopedia, from which more elaborate definitions and contextual information for particular words can be obtained.

In the following, the three natural language processing subsystems—morphological, syntactic, and semantic—are described in the context of processing the sample input text:

"The person whom I met was my friend." FIG. 1 is a block diagram illustrating the flow of information between the subsystems of natural language processing. The morphological subsystem 101 receives the input text and outputs an identification of the words and senses for each of the various parts of speech in which each word can be used. The syntactic subsystem 102 receives this information and generates a syntax parse tree by applying syntax rules. The semantic subsystem 103 receives the syntax parse tree and generates a logical form graph.

FIGS. 2–5 display the dictionary information stored on an electronic storage medium that is retrieved for the input words of the sample input text during morphological analysis. FIG. 2 displays the dictionary entries for the input words "the" 201 and "person" 202. Entry 201 comprises the key "the" 203 and a list of attribute/value pairs. The first attribute "Adj" 204 has, as its value, the symbols contained within the braces 205 and 206. These symbols comprise two further attribute/value pairs: (1) "Lemma" / "the" and (2) "Bits" /"Sing Plur Wa6 Det Art BO Def." A lemma is the basic, uninflected form of a word. The attribute "Lemma" therefore indicates that "the" is the basic, uninflected form of the word represented by this entry in the dictionary. The attribute "Bits" comprises a set of abbreviations representing certain morphological and syntactic information about a word. This information indicates that "the" is: (1) singular; (2) plural; (3) not inflectable; (4) a determiner; (5) an article; (6) an ordinary adjective; and (7) definite. Attribute 204 indicates that the word "the" can serve as an adjective. Attribute 212 indicates that the word "the" can serve as an adverb. Attribute "Senses" 207 represents the various meanings of the word as separate definitions and examples, a portion of which are included in the list of attribute/value pairs between braces 208–209 and between braces 210–211. Additional meanings actually contained in the entry for "the" have been omitted in FIG. 2, indicated by the parenthesized expression "(more sense records)" 213.

In the first step of natural language processing, the morphological subsystem recognizes each word and punctuation symbol of the input text as a separate token and constructs an attribute/value record for each token using the dictionary information. The attributes include the token type (e.g., word, punctuation) and the different parts of speech which a word can represent in a natural language sentence.

The syntactic subsystem inputs the initial set of attribute/value records for the sample input text, generates from each a syntax parse tree node, and applies syntax rules to these initial nodes to construct higher-level nodes of a possible syntax parse tree that represents the sample input text. A complete syntax parse tree includes a root node, intermediate-level nodes, and leaf nodes. The root node represents the syntactic construct (e.g., declarative sentence) for the sample input text. The intermediate-level nodes represent intermediate syntactic constructs (e.g., verb, noun, or prepositional phrases). The leaf nodes represent the initial set of attribute/value records.

In certain NLP systems, syntax rules are applied in a top-down manner. The syntactic subsystem of the NLP system herein described applies syntax rules to the leaf nodes in a bottom-up manner. That is, the syntactic subsystem attempts to apply syntax rules one-at-a-time to single leaf nodes to pairs of leaf nodes, and, occasionally, to larger groups of leaf nodes. If the syntactic rule requires two leaf nodes upon which to operate, and a pair of leaf nodes both contain attributes that match the requirements specified in the rule, then the rule is applied to them to create a higher-level syntactic construct. For example, the words "my friend" could represent an adjective and a noun, respectively, which can be combined into the higher-level syntactic construct of a noun phrase. A syntax rule corresponding to the grammar rule, "noun phrase=adjective+noun," would create an intermediate-level noun phrase node, and link the two leaf nodes representing "my" and "friend" to the newly created intermediate-level node. As each new intermediate-level node is created, it is linked to already-existing leaf nodes and intermediate-level nodes, and becomes part of the total set of nodes to which the syntax rules are applied. The process of applying syntax rules to the growing set of nodes continues until either a complete syntax parse tree is generated or until no more syntax rules can be applied. A complete syntax parse tree includes all of the words of the input sentence as leaf nodes and represents one possible parse of the sentence.

This bottom-up method of syntax parsing creates many intermediate-level nodes and sub-trees that may never be included in a final, complete syntax parse tree. Moreover, this method of parsing can simultaneously generate more than one complete syntax parse tree.

The syntactic subsystem can conduct an exhaustive search for all possible complete syntax parse trees by continuously applying the rules until no additional rules can be applied. The syntactic subsystem can also try various heuristic approaches to first generate the most probable nodes. After one or a few complete syntax parse trees are generated, the syntactic subsystem typically can terminate the search because the syntax parse tree most likely to be chosen as best representing the input sentence is probably one of the first generated syntax parse trees. If no complete syntax parse trees are generated after a reasonable search, then a fitted parse can be achieved by combining the most promising sub-trees together into a single tree using a root node that is generated by the application of a special aggregation rule.

FIG. 6 illustrates the initial leaf nodes created by the syntactic subsystem for the dictionary entries initially displayed in FIGS. 2–5. The leaf nodes include two special nodes, 601 and 614, that represent the beginning of the sentence and the period terminating the sentence, respectively. Each of the nodes 602–613 represent a single part of speech that an input word can represent in a sentence. These parts of speech are found as attribute/value pairs in the dictionary entries. For example, leaf nodes 602 and 603 represent the two possible parts of speech for the word "The," that are found as attributes 204 and 212 in FIG. 2.

FIG. 7–22 show the rule-by-rule construction of the final syntax parse tree by the syntactic subsystem. Each of the figures illustrates the application of a single syntax rule to generate an intermediate-level node that represents a syntactic structure. Only the rules that produce the intermediate-level nodes that comprise the final syntax tree are illustrated. The syntactic subsystem generates many intermediate-level nodes which do not end up included in the final syntax parse tree.

In FIGS. 7–14, the syntactic subsystem applies unary syntax rules that create intermediate-level nodes that represent simple verb, noun, and adjective phrases. Starting with FIG. 15, the syntactic subsystem begins to apply binary syntax rules that combine simple verb, noun, and adjective phrases into multiple-word syntactic constructs. The syntactic subsystem orders the rules by their likelihood of successful application, and then attempts to apply them one-by-one until it finds a rule that can be successfully applied to the existing nodes. For example, as shown in FIG. 15, the syntactic subsystem successfully applies a rule that creates a node representing a noun phrase from an adjective phrase and a noun phrase. The rule specifies the characteristics required of the adjective and noun phrases. In this example, the adjective phrase must be a determinate quantifier. By following the pointer from node 1501 back to node 1503, and then accessing morphological information included in node 1503, the syntactic subsystem determines that node 1501 does represent a determinate quantifier. Having located the two nodes 1501 and 1502 that meet the characteristics required by the rule, the syntactic subsystem then applies the rule to create from the two simple phrases 1501 and 1502 an intermediate-level node that represents the noun phrase "my friend." In FIG. 22, the syntactic subsystem generates the final, complete syntax parse tree representing the input sentence by applying a trinary rule that combines the special Begin1 leaf node 2201, the verb phrase "The person whom I met was my friend" 2202, and the leaf node 2203 that represents the final terminating period to form node 2204 representing the declarative sentence.

The semantic subsystem generates a logical form graph from a complete syntax parse tree. Commonly, the logical form graph is constructed from the nodes of a syntax parse tree, adding to them attributes and new bi-directional links. The logical form graph is a labeled, directed graph. It is a semantic representation of an input sentence. The information obtained for each word by the morphological subsystem is still available through references to the leaf nodes of the syntax parse tree from within nodes of the logical form graph. Both the directions and labels of the links of the logical form graph represent semantic information, including the functional roles for the nodes of the logical form graph. During its analysis, the semantic subsystem adds links and nodes to represent (1) omitted, but implied, words; (2) missing or unclear arguments and adjuncts for verb phrases; and (3) the objects to which prepositional phrases refer.

FIG. 23 illustrates the complete logical form graph generated by the semantic subsystem for the example input sentence. Meaningful labels have been assigned to links 2301–2306 by the semantic subsystem as a product of the successful application of semantic rules. The six nodes 2307–2312, along with the links between them, represent the essential components of the semantic meaning of the sentence. In general, the logical form nodes roughly correspond to input words, but certain words that are unnecessary for conveying semantic meaning, such as "The" and "whom" do not appear in the logical form graph, and the input verbs "met" and "was" appear as their infinitive forms "meet" and "be." The nodes are represented in the computer system as records, and contain additional information not shown in FIG. 23. The fact that the verbs were input in singular past tense form is indicated by additional information within the logical form nodes corresponding to the meaning of the verbs, 2307 and 2310.

The differences between the syntax parse tree and the logical form graph are readily apparent from a comparison of FIG. 23 to FIG. 22. The syntax parse tree displayed in FIG. 22 includes 10 leaf nodes and 16 intermediate-level nodes linked together in a strict hierarchy, whereas the logical form graph displayed in FIG. 23 contains only 6 nodes. Unlike the syntax parse tree, the logical form graph is not hierarchically ordered, obvious from the two links having opposite directions between nodes 2307 and 2308. In addition, as noted above, the nodes no longer represent the exact form of the input words, but instead represent their meanings.

Further natural language processing steps occur after semantic analysis. They involve combining the logical form graph with additional information obtained from knowledge bases, analyzing groups of sentences, and generally attempting to assemble around each logical form graph a rich contextual environment approximating that in which humans process natural language.

Lexical Processing of Uppercase and Unaccented Text

In the above general discussion of the morphological subsystem, the morphological subsystem was described as providing dictionary information for each input word. The morphological subsystem employs an electronic dictionary to find that information. For each input word, the morphological subsystem must find a corresponding entry or entries in the dictionary from which to obtain the information. This process of looking up input words in an electronic dictionary presents several related problems, the solution of which greatly impacts the accuracy and efficiency of the entire NLP.

The keys of commonly-used dictionaries contain both diacritical marks and, in the case of proper nouns, upper case letters. For example, in an English language dictionary, there is a separate entry for the verb "resume," without an accent mark, and for the noun "resumé," with an accent mark. As another example, the English-language dictionary commonly contains two entries having the key "polish," representing the noun "polish" and the verb "polish," as well as two entries with the key "Polish," representing the proper noun "Polish" and the proper adjective "Polish."

Unfortunately, the cases and diacritical markings of letters in input text may not match the cases and diacritical markings of the dictionary keys that correspond to them, greatly complicating the task of finding dictionary entries during morphological analysis. For example, in input text with all upper-case letters, as well as in input text from electronic mail messages, diacritical marks are generally removed. A capitalized word lacking diacritical marks may possibly represent any of a number of lower case normal forms. For example, the French words "élève," which means "student," and "élevé," which means "raised," both have the capitalized form "ELEVE." If capitalized text is being processed, and the French dictionary has lower-case entries, it is not clear which lower-case entry should be chosen to describe the input word "ELEVE."

Because entries in common dictionaries are generally in lower-case form, and because the case of the letters of an input word is often determined by the word's occurrence as the first word of a sentence or the word's occurrence in a title, rather than from the morphological function of the word, a morphological subsystem might first change the letters of input words to all lower case before attempting to match the word to keys in a dictionary. The process of changing all the letters to lower case is a particular type of case normalization. Removing all diacritical marks from the letters of an input word is an example of another type of normalization. The process of normalization substitutes certain letters for others in input words in order to remove unwanted distinctions between words. By normalizing to all lower case, the input words "Polish" and "polish" both become the normalized word "polish."

Although case normalization makes it easier for the morphological subsystem to find dictionary keys matching a word that, only because of its occurrence as the first word of a sentence, has its first letter capitalized, case normalization may cause a loss of morphological distinction based on capitalization. For example, a sentence in a book might read:

"I told him to polish his shoes." Alternatively, it might read: "'Polish your shoes,' I told him." Perhaps the title of the book is "POLISH YOUR SHOES!" The normalized word for "polish," "Polish," and "POLISH" in the three sentences is "polish." However, consider the sentence: "The Polish government announced new elections today." If the word "Polish" is normalized to "polish" prior to subsequent analysis, the morphological distinction between "Polish" and "polish" is lost. In this last case, the capitalization of the word "Polish" indicates its morphological difference from the word "polish," and not its position in a sentence or a title.

The underlying problem for both loss of diacritical marks and loss of case distinction is the lack of efficiency in dictionary lookup caused by the need to search an electronic dictionary for multiple entries for each input word. For the French-language example given above, there is a quite large number of possible dictionary entries corresponding to the input word "ELEVE," including every possible combination of unmarked and marked letters "e" in the first, third, and fifth position of the word. There are four lower-case letters that correspond to the upper-case letter "E." These are "e", "è," "ê," and "é. " There are therefore $4^3$ or 64 different possible combinations of these four lower-case letters within the input word "ELEVE." Even if various orthographic and phonologic rules are used to eliminate certain combinations that cannot occur in the French language, 36 valid combinations remain. Dictionary lookups are expensive. Each lookup may involve one or more disk accesses. In the English language example given above, the input word "Polish" would always require four lookups, two lookups for the two separate entries having the key "polish," and two for the two separate entries having the key "Polish." Of course, if the morphological subsystem fails to exhaustively search for all entries related to an input word by change in case or by the addition of possibly omitted diacritical marks, it may provide an erroneous result to the syntactic and semantic subsystems, leading to an incorrect parse and logical form graph.

Prior art electronic dictionaries and morphological analysis subsystems failed to handle the problem of normalization of capitalized input words. A need for a method for efficiently finding all the entries in an electronic dictionary that correspond to an input word from which diacritical marks have been stripped because of transfer through electronic mail, or that correspond to an upper-case input word, has been recognized in the art of natural language processing.

SUMMARY OF THE INVENTION

The present invention is directed to a method and system for locating information in an electronic dictionary. The system creates the electronic dictionary by first generating a normalized form from the canonical forms of the word to be stored in the dictionary. The canonical, or conventional, form of a word uses the appropriate upper and lower case letters and the appropriate diacritical marks. The canonical form of a word is the form in which the word would appear as a key for an entry in a conventional printed dictionary. The normalized form of a word has all lower case letters and no diacritical marks. For example, "Polish" is the canonical form of the word relating to Poland, and "polish" is the canonical form of the word relating to "wax." However, the normalized form of both words is "polish." The system then stores an entry in the electronic dictionary for each unique normalized form of a word (e.g., "polish"). Each entry has a key and a record. The key is set to the normalized form of the word. For each canonical form of a word whose normalized form equals the unique normalized form, the system stores a sub-record within the record. The sub-record contains information relating to the canonical form of the word such as the definition of that word and the part of speech for that word. Continuing with the same example, the key for one entry would be "polish" and that entry would contain sub-record for "polish" and "Polish." To locate the information, the system receives an input word (e.g., "POLISH") and generates a normalized form of the input word. The system then searches the electronic dictionary for an entry with a key that matches the normalized form of the input word. The found entry contains a sub-record with information relating to the canonical form of the word. By organizing the electronic dictionary according to normalized forms, the information relating to an input word, regardless of the presence or absence of capitalization and diacritical marks can be found by searching for only one entry.

BRIEF DESCRIPTION OF THE DRAWINGS

FIGS. 2–5 display the dictionary information stored on an electronic storage medium that is retrieved for each word of the example input sentence: "The person whom I met was my friend."

FIG. 6 displays the leaf nodes generated by the syntactic subsystem as the first step in parsing the input sentence.

FIGS. 7–22 display the successive application of syntax rules by the syntactic subsystem to parse of the input sentence and produce a syntax parse tree.

FIG. 23 illustrates the logical form graph generated by the semantic subsystem to represent the meaning of the input sentence.

FIG. 28 shows the electronic dictionary entry for the key "building" in an unspecified dictionary.

FIG. 29 shows the electronic dictionary entry for the key "building" in a dictionary fully-specified with respect to homographic forms.

DETAILED DESCRIPTION OF THE INVENTION

The present invention is directed to a method and system for storing and locating information in an electronic dictionary. In a preferred embodiment, the system creates the electronic dictionary by first generating a normalized form from the canonical form of each of the words to be stored in the dictionary. The normalized form of a word has all lower case letters and no diacritical marks. The system then, for each unique normalized form of a word, stores an entry in the electronic dictionary. Each entry has a key and a record. The key is set to the normalized form of the word. For each canonical form of a word whose normalized form equals the unique normalized form, the system stores a sub-record within the record. The sub-record contains information relating to the canonical form of the word. To locate the information using the electronic dictionary, the system receives an input word and generates a normalized form of the input word. The system then searches the electronic dictionary for an entry with a key that matches the normalized form of the input word. The found entry contains a sub-record with information relating to the canonical form of the word.

Figure 1:
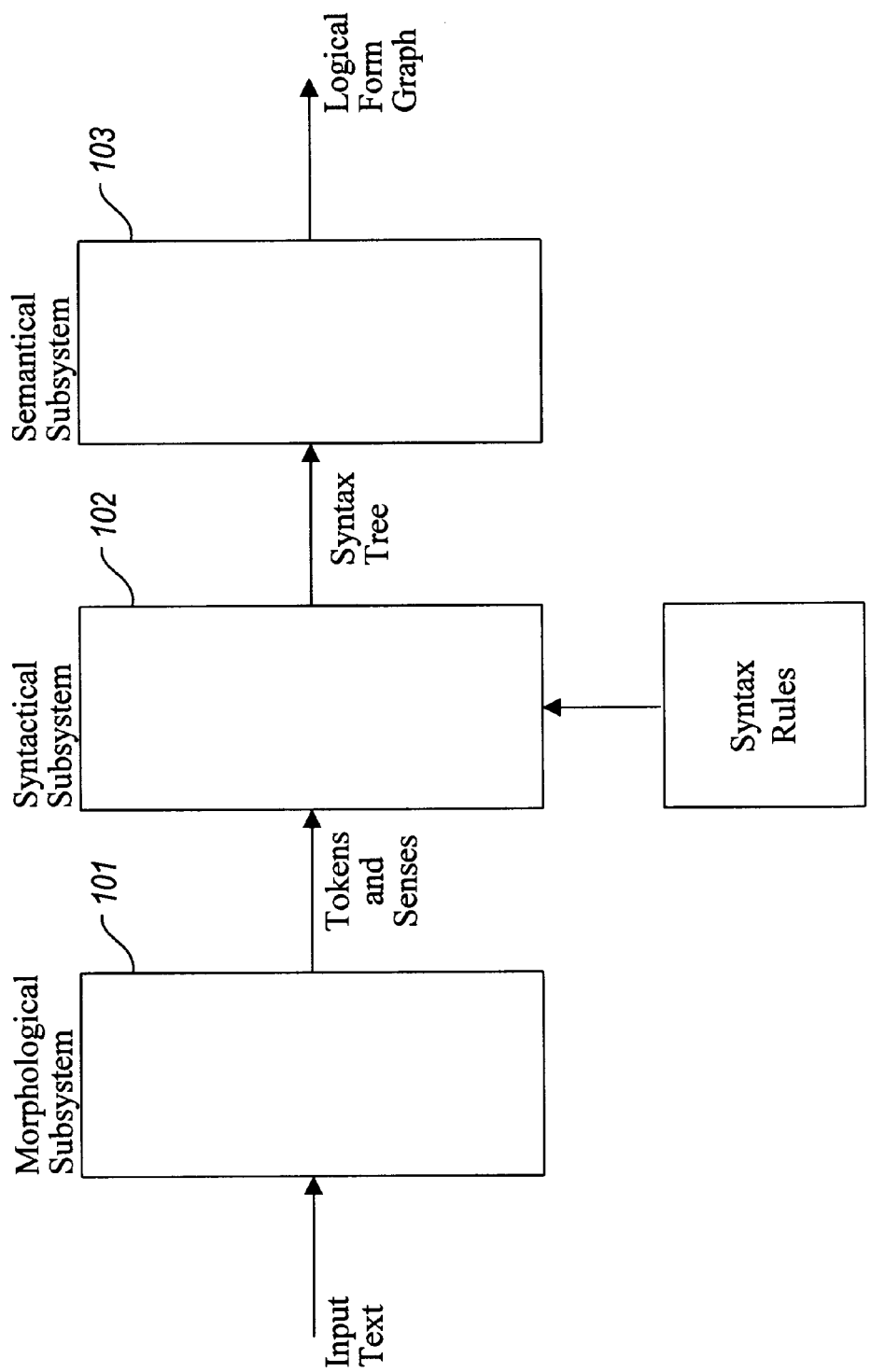
FIG. 1 is a block diagram illustrating the flow of information between the subsystems of a natural language processing system.
Figure 24:
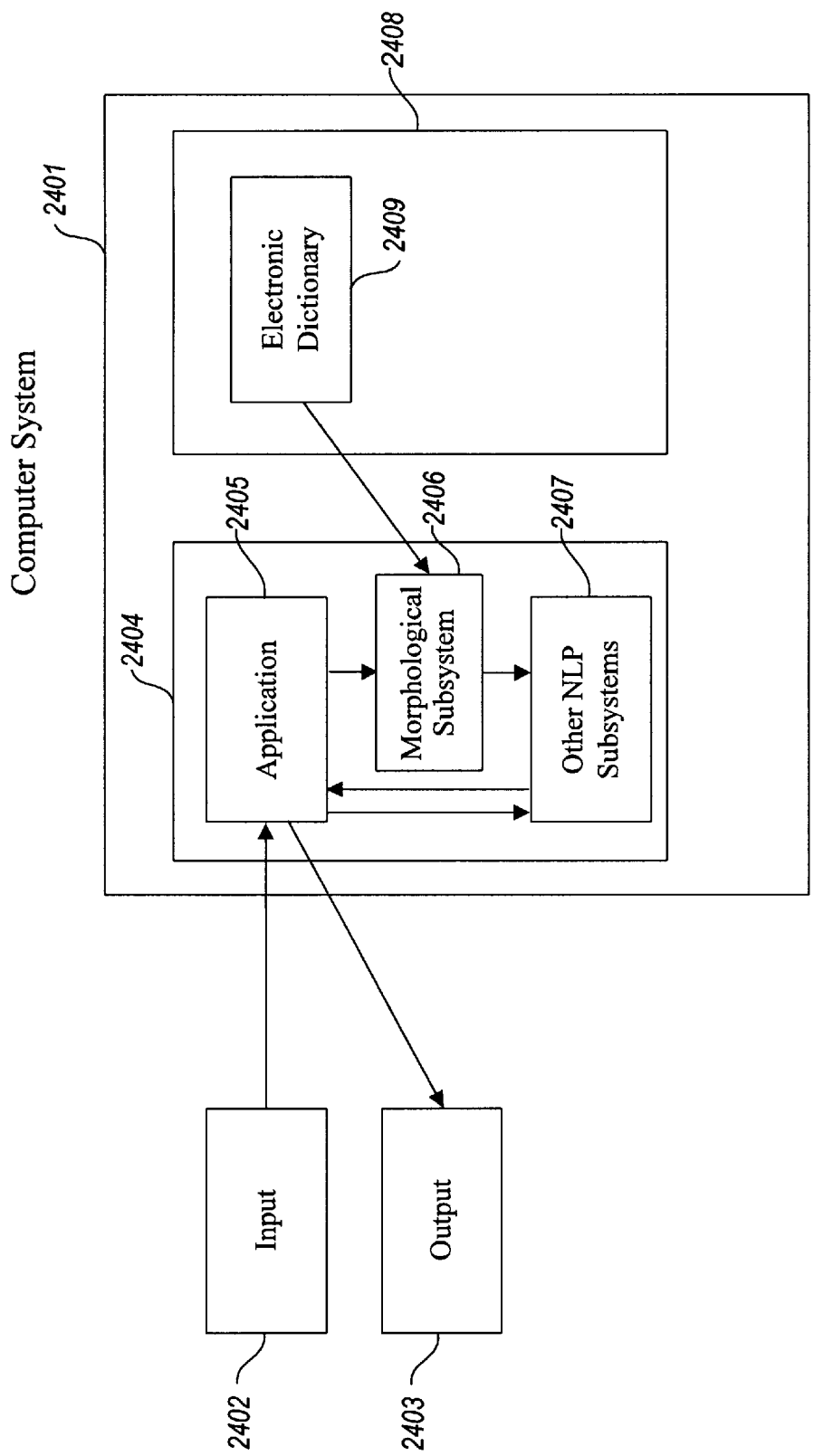
FIG. 24 shows a block diagram illustrating a preferred computer system for natural language processing.

FIG. 24 is a block diagram illustrating a preferred computer system for a natural language processing system. The computer system 2401 contains a central processing unit, a memory, and a storage device. The morphological subsystem 2406 and the other subsystems of the natural language processing system 2407 are typically loaded into memory 2404 from a computer-readable memory device such as a disk. An application program that uses the services provided by the natural language processing system 2405 is also typically loaded into memory. The electronic dictionary 2409 is stored on a storage device, such as a disk 2408, and entries are read into memory for use by the morphological subsystem. In one embodiment, a user typically responds to a prompt displayed on the output device 2403 by entering one or more natural language sentences on an input device 2404. The natural language sentences are received by the application, processed, and then passed to the natural language processing system by way of the morphological subsystem. The morphological subsystem extracts information from the electronic dictionary, uses that information to process the input text passed to it, and then passes the processed input text and dictionary information to the other subsystems of the natural language processing system. The application program then can send and receive information to the natural language subsystem in order to make use of the machine understanding of the input text achieved by the natural language processing system, and then finally output a response to the user on an output device 2403.

A preferred embodiment of the invention provides a new dictionary method and system for organizing the contents of an electronic dictionary and for searching the electronic dictionary. The new dictionary system provides a dictionary creation component ("DCC") and a dictionary lookup component ("DLC").

Dictionary Creation

Figure 25:
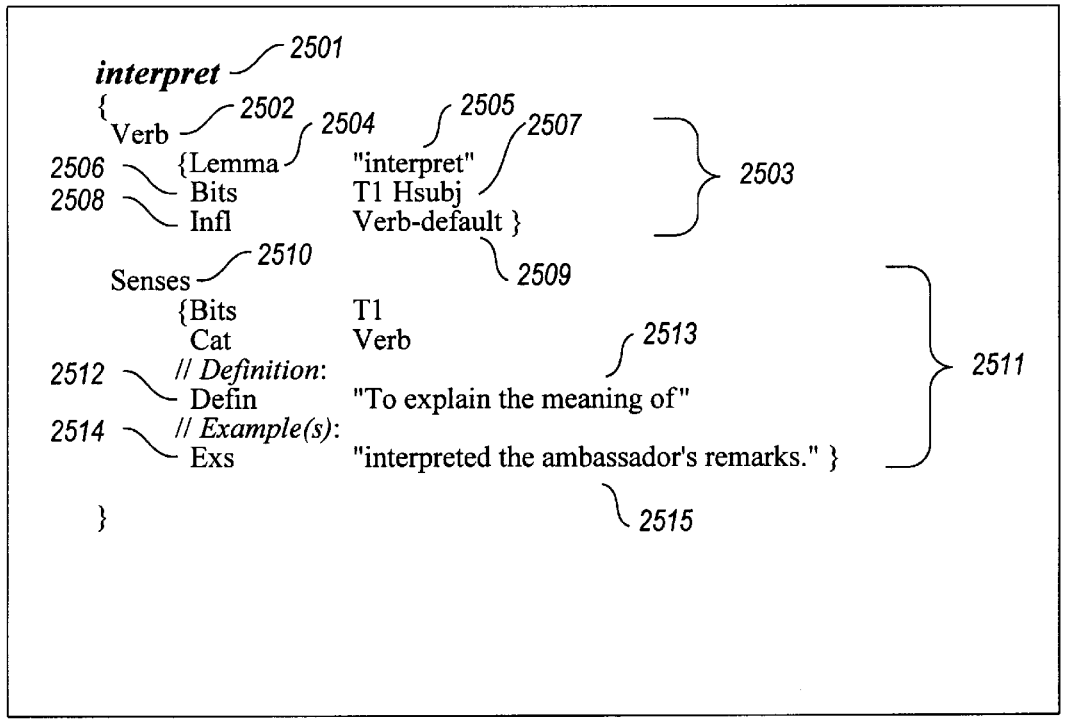
FIG. 25 shows the electronic dictionary entry for the key "interpret."

The DCC creates entries for words of a language analogous to entries found in a common, printed dictionary. FIG. 25 displays the form of an electronic dictionary entry for the word "interpret." The entry has a key 2501 followed by a record containing attribute/value pairs. The first attribute 2502 is a part of speech which this word can represent in the language. The value of attribute 2502 is the sub-record 2503, which contains a series of attribute/value pairs. The first attribute in sub-record 2503 is "Lemma" 2504. The value of "Lemma" is the uninflected form of the word represented by the attribute/value pair 2504–2505, in this case the same as the key 2501. The attribute "Bits" 2506 has the value "Tl Hsubj" 2507 which means that verb "interpret" is transitive and takes a human subject. The attribute "Infl" 2508 has the value "Verb-default" which indicates that the verb assumes inflected forms in the default fashion by adding the endings -ed, -s, and -ing to the form of the verb specified as the value of the "Lemma" attribute 2505. The second attribute of the main record for this entry, "Senses" 2510, has a sub-record value 2511 that contains definitions and examples of the word "interpret." Sub-record attribute "Defin" 2512 has the value 2513 that explains the meaning of the word, and sub-record attribute "Exs" 2514 has the value 2515 that provides a brief example of the use of the word.

The DCC creates an entry in the electronic dictionary for each case-normalized and diacritics-normalized word in a language, or for a subset of the case-normalized and diacritics-normalized words. A case-normalized word has only lower-case letters, and a diacritics-normalized word does not contain diacritical marks. Normalization with respect to case and diacritical marks has the effect, in certain cases, of mapping different words to a single key. In the following discussion, "normalized word" will refer to a case and diacritics-normalized word.

Figure 26:
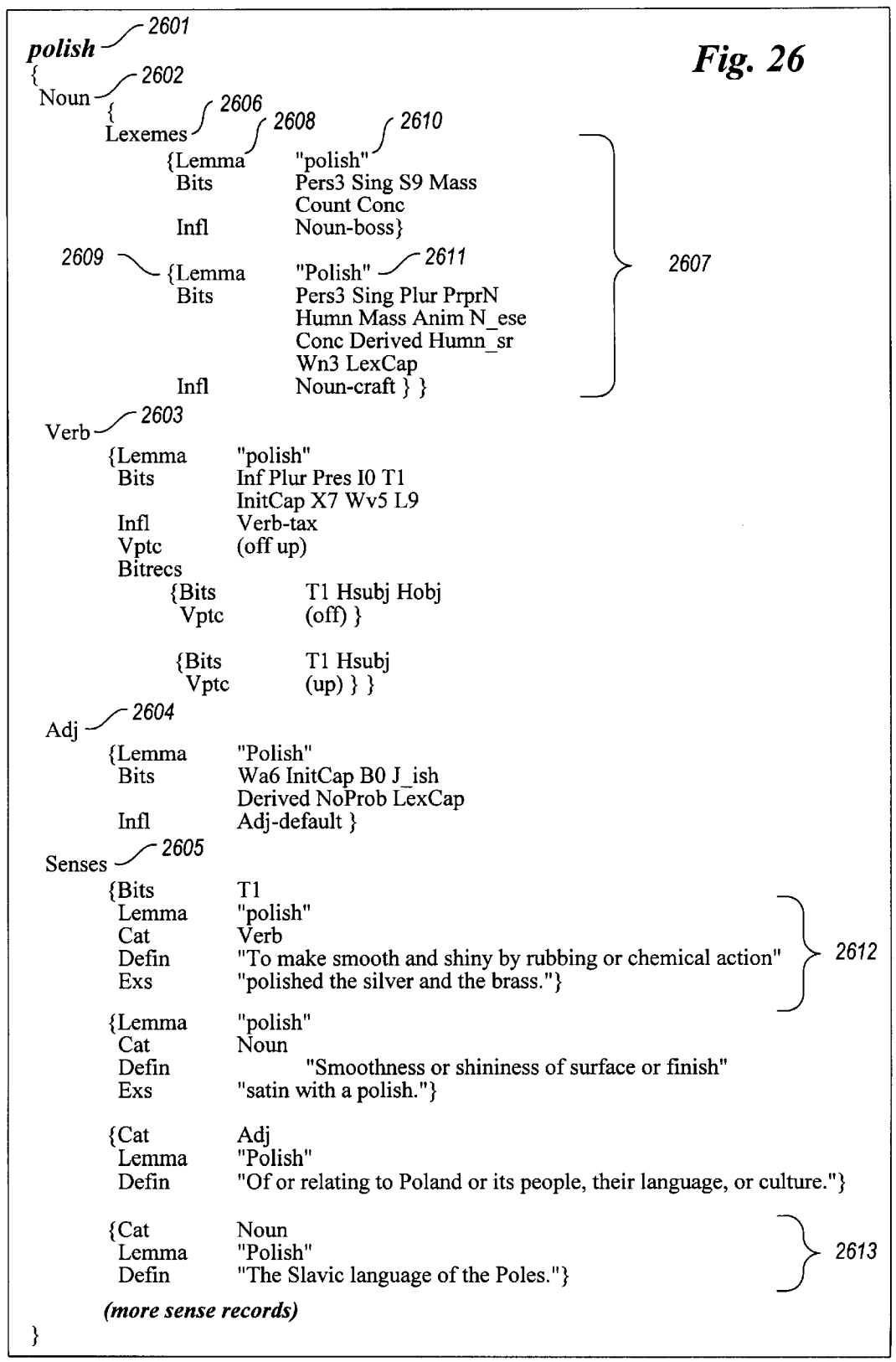
FIG. 26 shows the electronic dictionary entry for the key "polish."

FIG. 26 displays the electronic dictionary entry for the case-normalized key "polish" 2601. There are 4 main attributes within the main record of the entry, 2602–2605, that correspond to the three parts of speech, "Noun," "Verb," and "Adverb" that words with the case-normalized form "polish" can represent, and the attribute "Senses" that represents the various meanings of the words with the case-normalized form "polish." In the sub-record representing the value of the attribute "Noun" is the attribute "Lexemes" 2606 that has as its value a sub-record 2607 that contains two "Lemma" attributes 2608 and 2609. The values of these two "Lemma" attributes, "polish" 2610 and "Polish" 2611 are the un-normalized forms of two different words, also known as the canonical forms of the words. The word represented by "Lemma" 2610 is the noun "polish," one meaning of which is "a waxy substance that one smears on a car to protect its surface." The word represented by "Lemma" 2611 is the noun, one meaning of which is "the Slavic language of the Poles." The attribute "Lexemes" thus indicates that more than one word having the normalized form "polish" can occur as a particular part of speech. Throughout the remainder of the entry, the information pertaining to the word "polish" is introduced by the attribute/value pair "Lemma" / "polish," as, for example, the definition 2612, whereas the information pertaining to the word "Polish" is introduced by the attribute/value pair "Lemma" / "Polish," as, for example, the definition 2613.

Figure 27:
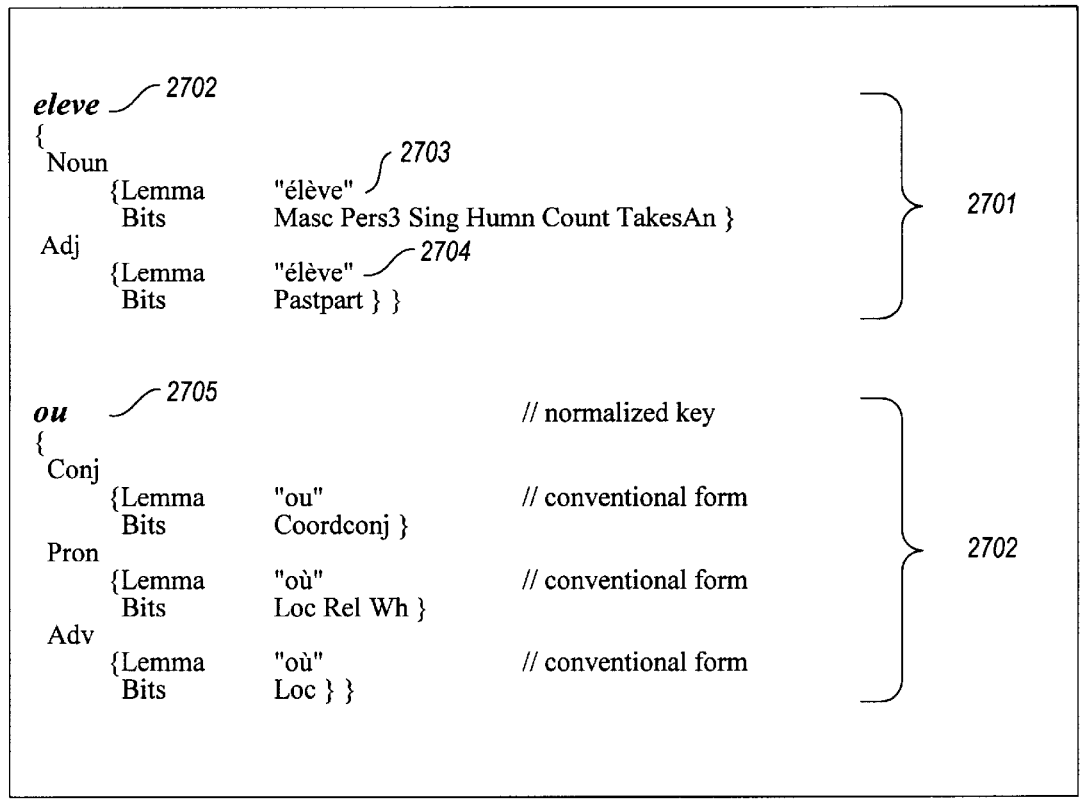
FIG. 27 shows the electronic dictionary entries for the keys "eleve" and "ou."

FIG. 27 displays two entries 2701 and 2702 from a French language dictionary to illustrate normalization of words containing diacritical marks. The normalized key "eleve" 2702 represents the two different canonical forms "élève" 2703 and "élevé" 2704. The normalized key "ou" 2705 represents the two different canonical forms "ou" and "où."

An electronic dictionary can be either partially or fully-specified with respect to morphologically derived word forms. A fully-specified dictionary with respect to morphological word forms ("FSM dictionary") contains separate entries for "hike," "hiked," "hiking," and "hikes," whereas an unspecified dictionary with respect to morphological word forms ("USM dictionary") contains a single entry "hike" which represents the form "hike" as well as the forms "hiked," "hiking," and "hikes" that can be derived from the word "hike." FSM dictionaries obviously contain many more entries. Because they contain separate entries for closely related words, as in the example of the word "hike" and its related forms, a FSM dictionary may contain a great number of redundant definitions and other information. The entries for "hike," "hikes," and "hiked" might all contain the basic definition of a walking action undertaken for pleasure or exercise. Alternatively, only one of the entries could contain the definitions, like, for example, the entry for "hike," and the other entries could contain pointers to those definitions.

In general, USM dictionaries are preferred, because they are smaller, allowing them to be more easily placed on a fixed-size storage medium and allowing them to be more effectively cached in memory. In addition, the overhead for applying morphological rules to generate related forms of a word, like, for example, to generate "hikes" and "hiked" from the word "hike," is quite small. Irregular forms are included in the dictionary as separate entries to avoid expanding the set of morphological rules to include a large number of very specific rules, like, for example, a rule that derives the past tense form "kept" from the present tense form "keep." The DCC normally creates entries partially-specified with respect to morphologically derived forms.

A dictionary may be constructed so that, if an input word is initially matched to a key in the dictionary, it is guaranteed that no morphological rules need to be applied to the input word to find other possible forms which might correspond to the input word. For example, consider looking up the input word "building" from the input sentence "I am building a bridge." In this case, "building" is an inflected form of the uninflected form "build." It might be the case that, in the entry corresponding to the key "building," only records representing the uninflected form "building" are found, or, in other words, records representing the noun "building." In order to find the record corresponding to the present singular verb "building," the DLC would, in this case, apply a morphological rule to "building" to produce the verb "to build" and then look up "build." This type of dictionary is known as an under-specified dictionary with respect to homographic word forms ("USH dictionary"). The USH dictionary entry for the noun "building" is displayed in FIG. 28. The only attribute/value pair, 2801, in the entry with key "building" 2802 corresponds to the noun "building." A fully-specified dictionary with respect to homographic word forms ("FSH dictionary") guarantees that the entry with key "building" includes an attribute/value pair corresponding to the verb "to build." The FSH dictionary entry for the key "building" is shown in FIG. 29. If a normalized input word is matched to a key in a FSH dictionary, no morphological rules need be applied to the input word to find all relevant records.

The FSH dictionary is not the same as a FSM dictionary. In an FSM dictionary, no morphological rules ever need be applied. In a FSH dictionary, morphological rules are applied when a matching key for the input word is not found. For example, there will be a key matching the input word "buildings" in a FSM dictionary. A FSH dictionary, by contrast, would not contain the key "buildings." A morphological rule that specified that "buildings" is the plural of "building" would need to be applied to generate the form "building" in order to look up the appropriate entry in a FSH dictionary. FSH dictionaries are generally partially-specified with respect to morphological forms.

When the DCC constructs the electronic dictionary, it applies a normalization function using a language specific lookup table to each word of the natural language obtained from a previously compiled natural language dictionary or some other comparable source of words. The language specific lookup table is a simple mapping between each ASCII character of the language and its normalized form. An example of a portion of one mapping might be:

| z | A | Ä | B | C | D | E | Ë | F |
|---|---|---|---|---|---|---|---|---|
| z | a | a | b | c | d | e | e | f |

In a preferred embodiment, the lookup table is simply an array of replacement characters. The small integer value corresponding to the ASCII code for an input character is used as an index into the array to find the replacement character for the input character.

Figure 30:
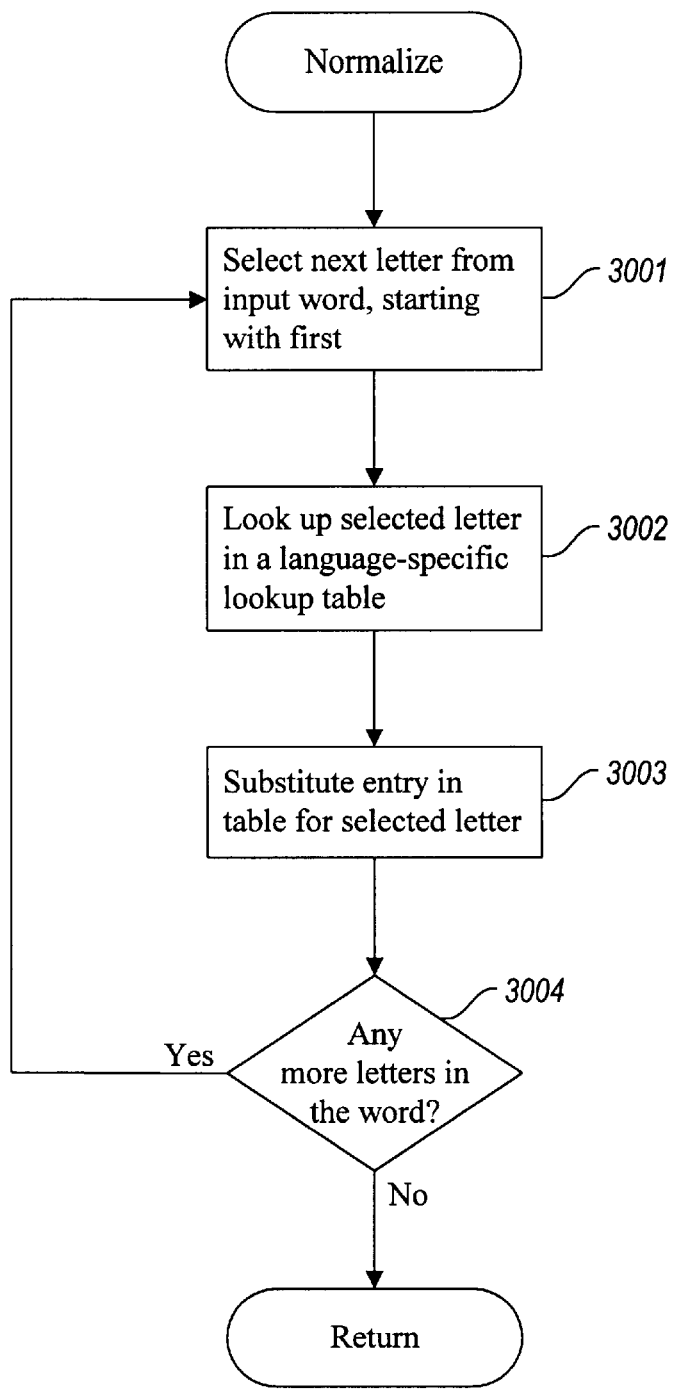
FIG. 30 is a flow diagram for the subroutine Normalize.

A flow diagram for the normalization function is displayed in FIG. 30. Steps 3001 through 3004 represent a loop through all the letters comprising the input word, where the DCC selects the next letter in each iteration. The DCC looks up the selected letter in a language specific lookup table in step 3002, and replaces the selected letter within the input word by the letter in the lookup table that corresponds to the selected letter in step 3003. If the selected letter was in upper-case form, or was modified by a diacritical mark, the lookup table entry will contain the lower-case letter or unmarked letter corresponding to the selected letter. The result of the routine is a word fully-normalized with respect to case and diacritical marks.

Figure 31:
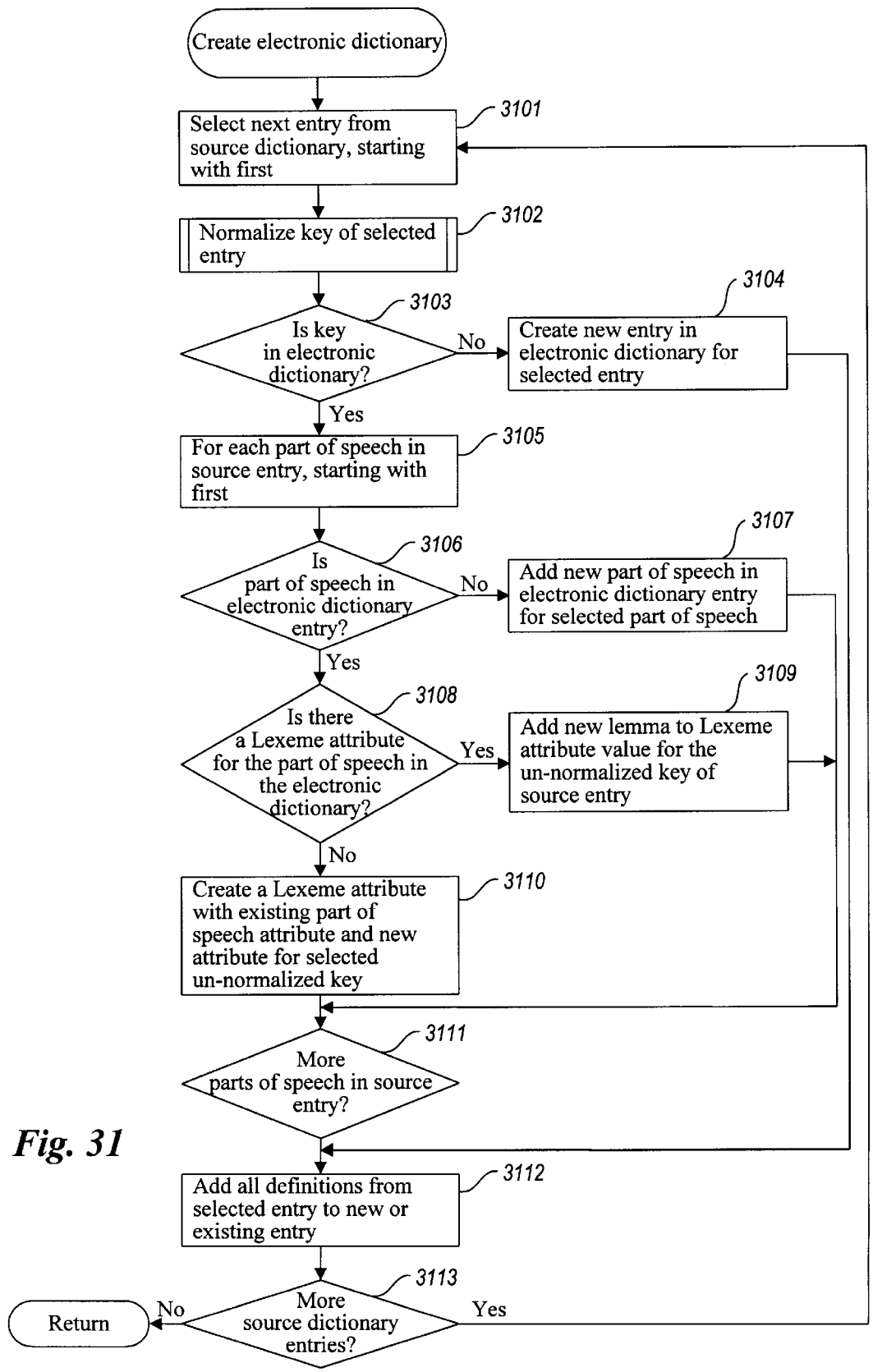
FIG. 31 is a flow diagram for a simple dictionary construction routine.

A flow diagram for a simple electronic dictionary construction routine is displayed in FIG. 31. This routine creates an electronic dictionary with normalized keys from an existing source dictionary without normalized keys. Steps 3101–3113 represent a loop, during each iteration of which the DCC selects an entry from the source dictionary and places the information from the selected entry into the electronic dictionary. In step 3101, the DCC selects the next source entry, starting with the first entry. In step 3102, the DCC normalizes the key of the selected entry using the normalization routine described above. In step 3103, the DCC determines whether a key corresponding to the normalized key of the selected source entry is already present in the electronic dictionary. If there is no such a key in the electronic dictionary, the DCC creates a new entry in the electronic dictionary having the normalized key as its key in step 3104. If such a key is already present, then the loop represented by steps 3105 through 3111 iterates over each part of speech in the selected source entry. The selected entry may contain, for example, definitions for a verb and definitions for a noun. The DCC selects the next part of speech, starting with the first part of speech, in step 3105. In step 3106, the DCC determines whether an attribute for that part of speech is already present in the electronic dictionary entry, like, for example, the noun attribute 2602 in FIG. 26. If not, the DCC adds a new attribute for that part of speech in step 3107. If such an attribute already does exist, then the DCC determines whether there is a Lexeme attribute in the value of the existing attribute, like, for example, the Lexemes attribute 2606 in FIG. 26. If not, the DCC adds a Lexeme attribute to the existing part of speech attribute, and places the existing attribute for the part of speech and a new attribute for the selected part of speech as values within the new Lexeme attribute in step 3110, like, for example, the attributes 2608 and 2609 of FIG. 26. If a Lexeme attribute already exists, then the DCC simply adds the selected part of speech to the Lexeme attribute in step 3109. Once all parts of speech in the selected entry have been selected, the DCC adds the definitions of the selected entry to the new or existing electronic dictionary entry in step 3112.

The DCC can create FSM, FSH, or USH dictionaries. A global variable used during parsing indicates whether the dictionary is of type FSM, FSH, or USH. A different global variable indicates whether an electronic dictionary has normalized keys.

Dictionary Lookup

As discussed above, the electronic dictionary may have several different organizations. It may be a FSM dictionary, in which case no morphology rules need be applied to an input word in order to find its corresponding key in the dictionary. It may be a FSH dictionary, in which case morphological rules need be applied only when a matching key is not found.

With all three types of dictionaries, the DLC first applies the normalization function, described in FIG. 29, to the input word. If the dictionary is of type FSM, the DLC then searches the dictionary for a key matching the normalized input word. If a key is found, the DLC returns the sub-records contained within the entry having that key with an indication of whether the canonical forms which they represent exactly match the un-normalized input word. If no matching key is found, the word does not exist in the dictionary.

If the dictionary is of type FSH, the DLC searches the dictionary for a key matching the normalized input word. If a key is found, the sub-records which it contains are returned with an indication of whether the canonical words which they represent exactly match the input word. If no matching key is found, the DLC applies any applicable morphological rules to the input word that generate one or more lemmas for the word, and then searches the dictionary for any keys that match the generated lemmas. If the DLC finds matching keys, it retrieves the sub-records contained within the entries corresponding to the matching keys, and returns each sub-record with an indication of whether the un-normalized input word exactly matches the canonical form represented by the sub-record. If no matching key is found, the word does not exist in the dictionary.

If the dictionary is not fully-specified with respect to homographic forms, the DLC applies any applicable morphological rules to the input word that generate one or more lemmas for the word, and then searches the dictionary for any keys that match any of the input word or the generated lemmas. If the DLC finds matching keys, it retrieves the sub-records contained within the entries corresponding to the matching keys, and returns each sub-record with an indication of whether the un-normalized input word exactly matches the canonical form represented by the sub-record. If no matching key is found, the word does not exist in the dictionary.

The DLC returns all of the sub-records the the entry, and not simply the sub-record whose canonical form exactly matches the un-normalized input word. A match can, in general, give some indication of the correctness of the contained definition, but it is not determinative. Consider again the two example sentences: (1) "I told him to polish his shoes."and (2) "'Polish your shoes,' I told him." For the first sentence, the DLC normalizes the word " polish" to "polish" and returns the sub-record representing the canonical form "polish," a synonym for "to shine," with an indication that it exactly matches the input word, and the sub-record representing the canonical form "Polish" with an indication the it does not exactly match the input word. In this case, the record with the exactly matching canonical form is the desired record. The same look-up result obtains for the second sentence, but, in this case, it is the sub-record that does not have an exactly matching canonical form that is the desired sub-record.

Because of the case and diactritics normalization of the keys and the inclusion of multiple sub-records representing canonical forms within a single entry, more sub-records are obtained as a result of each dictionary lookup in all three dictionary types. With one lookup, the DLC directly obtains all case and diacritical mark combinations. In the case of a FSM dictionary, only one lookup is ever needed. In the case of a FSH dictionary, only one lookup is often required, although, if no entry is found, additionally lookups may be required in the case that lemmas can be generated from the input word by applying morphological rules to it. In the case of a USH dictionary, the number of lookups required is equal to one plus the number of lemmas that can be generated by applying morphological rules to the input word.

By returning more records with each lookup, the number of lookups required to exhaustively search for a word is decreased. This decrease in lookups correspondingly decreases the number of disk fetches, and speeds up the process of dictionary searches.

Figure 32:
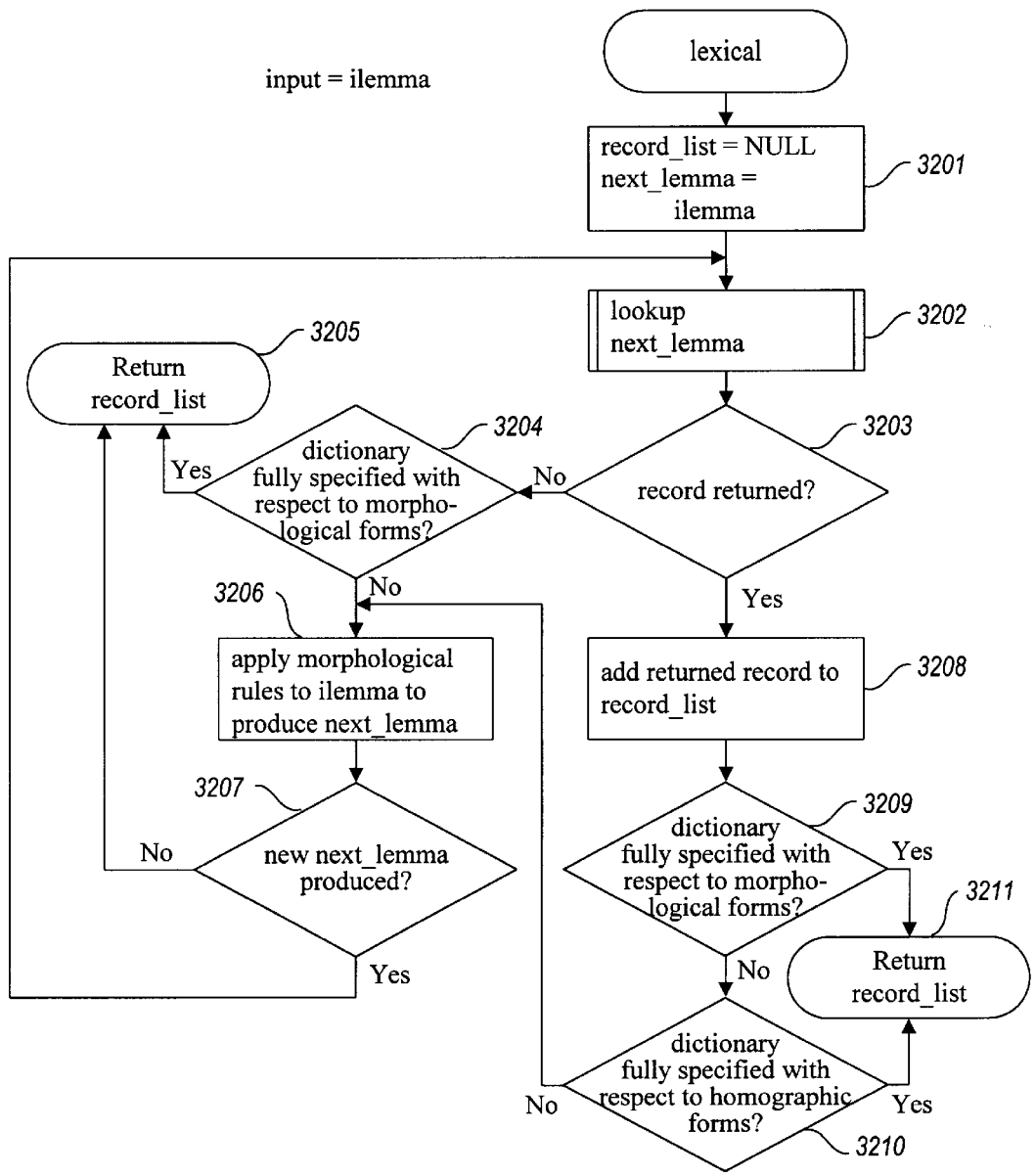
FIG. 32 is a flow diagram for the subroutine Lexical.

FIG. 32 displays a flow diagram for the lexical subroutine that finds all entries in an electronic dictionary that contain records that represent possible parts of speech and definitions of an input word passed to the subroutine as the argument "ilemma." In step 3201, the lexical subroutine initializes the variable "record_list" to be empty, and assigns to the variable "next_lemma" the value in ilemma. In step 3202, the lexical subroutine calls the lookup routine displayed in FIG. 33 to find an entry from the electronic dictionary with a key corresponding to ilemma. If no entry is found at step 3203, the lexical subroutine then determines whether the dictionary is of type FSM. If it is, then the lexical subroutine returns an empty record_list in step 3205. If the dictionary is not of type FSM, the lexical subroutine applies morphological rules to ilemma to produce another lemma in step 3206. If a new lemma is generated in step 3706, then control loops back to the beginning of the routine; otherwise, the lexical subroutine returns record_list at step 3205.

If the lexical subroutine finds a record at step 3203, the lexical subroutine adds that record to record_list in step 3208. Then, if the dictionary is of type FSM or FSH, as determined in steps 3209 and 3210, the lexical subroutine returns the record_list in step 3211. Otherwise, control passes to step 3206, where the subroutine lexical attempts to generate a new lemma.

Figure 33:
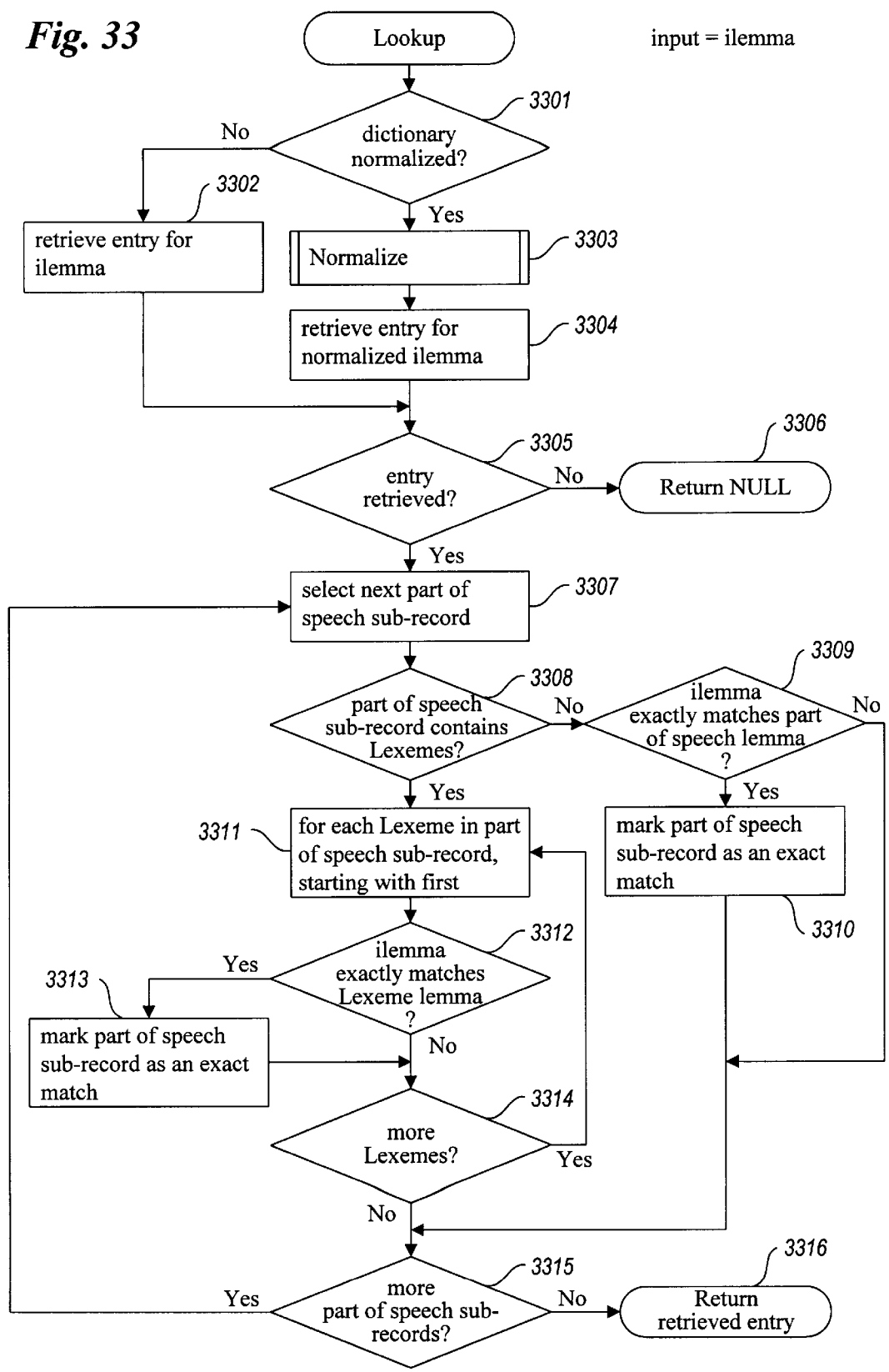
FIG. 33 is a flow diagram for the subroutine Lookup.

FIG. 33 displays a flow diagram for the lookup subroutine. This subroutine searches for a record with a key that matches a word input as the argument "ilemma." In step 3301, the lookup subroutine determines whether the dictionary has keys normalized with respect to case and diacritical marks. If the dictionary does not have normalized keys, the lookup routine searches the entries of the dictionary to find an entry with a key that matches ilemma in step 3302. If the dictionary does have normalized keys, then the subroutine normalize shown in FIG. 30 is called to generate the normalized word corresponding to ilemma in step 3303, and the lookup routine searches the entries of the dictionary to find an entry with a key that matches the normalized word corresponding to ilemma in step 3304. The lookup subroutine fails and returns NULL in step 3306 if no entry was found in step 3302 or step 3304.

If an entry was found, the lookup subroutine then executes the loop comprising steps 3307–3315 which iterates over each part-of-speech sub-record contained within the main record of the entry. If the record displayed in FIG. 29 was retrieved from the dictionary, for example, the first iteration of this loop would select the sub-record 2901 corresponding to the "Noun" attribute, and the second iteration of the loop would select sub-record 2903 corresponding to the "Verb" attribute 2904. The lookup subroutine determines, in step 3308, whether the selected sub-record contains a "Lexemes" attribute, as for example, attribute 2606 in FIG. 26. If it does not, then the lookup subroutine marks the selected sub-record as an exact match in step 3310 only if the "lemma" attribute of the selected sub-record exactly matches ilemma, and the loop represented by steps 3307–3315 continues with the next iteration.

If a "Lexemes" attribute is present in the selected sub-record, then an inner loop represented by steps 3311–3314 selects each lexeme from the value of the "Lexemes" attribute for each loop iteration. In FIG. 26, the attribute/ value pair 2608–2610 introduces the first lexeme, and the attribute/value pair 2609–2611 introduces the second lexeme. If the value of the "lemma" attribute of the selected lexeme exactly matches ilemma, the lookup subroutine marks that lexeme sub-record as an exact match in step 3313. The result of a call to the lookup subroutine is, therefore, either a NULL value, when no entry is found, or a dictionary entry with sub-records having "lemma" attributes that exactly match the input word marked as exact matches.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a computer system for identifying information in an electronic dictionary related to an input word, the electronic dictionary having records, each record being identified by a head word, the method comprising:
   designating the input word as a designated word and providing an initialized record list;
   determining whether the designated word is in the dictionary as a head word;
   when it is determined that the designated word is in the dictionary as a head word,
   adding the record identified by the designated word to the record list;
   if the dictionary is fully specified with respect to morphological forms or fully specified with respect to homographic forms, indicating that the record list contains the information;
   when it is determined that the designated word is not in the dictionary as a head word, if the dictionary is fully specified with respect to morphological forms, indicating that the record list contains the information;
   applying morphological rules to produce a morphologically related word;
   when the applying of morphological rules produces a morphologically related word, designating the related word as the designated word and repeating the determining with the newly designated word; and
   when the applying of morphological rules does not produce a morphologically related word, indicating that the record list contains the information.

2. The method of claim 1 including normalizing the designated word.

3. The method of claim 2 wherein the normalizing is with respect to diacritical marks.

4. The method of claim 2 wherein the normalizing is with respect to capitalization.

5. A method in a computer system for identifying information in an electronic dictionary related to an input word, the electronic dictionary having records, each record being identified by a head word, the method comprising:
   when the dictionary is fully specified with respect to morphological forms or fully specified with respect to homographic forms, indicating that any record with the input word as its head word is the information related to the input word; and
   when the dictionary is not fully specified with respect to homographic forms, applying morphological rules to produce related words and indicating that any record with a related word as its head word is information related to the input word.

6. The method of claim 5 wherein additional related words are produced by applying morphological rules to the related words.

7. The method of claim 5 wherein the input word is normalized with respect to capitalization.

8. The method of claim 5 wherein the input word is normalized with respect to diacritical marks.

9. A computer-readable medium containing instructions for causing a computer system to identify information in an electronic dictionary related to an input word, the electronic dictionary having records, each record being identified by a head word, by:
   when the electronic dictionary is fully specified as to morphological forms,
      when the input word is in the electronic dictionary as a head word, indicating that the record identified by the input word is the information; and
      when the input word is not in the electronic dictionary as a head word, indicating that information relating to the input word is not in the electronic dictionary; and
   when the electronic dictionary is fully specified as to homographic forms,
      when the input word is in the electronic dictionary as a head word, indicating that the record the input word is the information; and
      when the input word is not in the electronic dictionary as a head word, identifying words morphologically related to the input word and when an identified morphologically related word is in the electronic dictionary as a head word, indicating that the record identified by the identified word is information relating to the input word.

10. The computer-readable medium of claim 9 wherein the input word is normalized with respect to diacritical marks.

11. The computer-readable medium of claim 9 wherein the input word is normalized with respect to capitalization.

* * * * *

UNITED STATES PATENT AND TRADEMARK OFFICE
CERTIFICATE OF CORRECTION

PATENT NO. : 5,995,922
DATED : November 30, 1999
INVENTOR(S) : Joseph E. Pentheroudakis et al.

It is certified that error appears in the above-identified patent and that said Letters Patent is hereby corrected as shown below:

Title page:
Inventors: item [75] delete "Penteroudakis" should be -- Pentheroudakis --.
References: One reference missing: Item [56] insert -- 5,146,406 9/8/1992 Jensen 364/419 --.

Column 10:
Line 17, "Adverb" should be -- Adjective --.

Column 12:
Line 65, insert -- Again, as described above, morphological rule would need to be applied to the input word "buildings" in order to generate the key "building," since a FSH dictionary would not contain an entry with the key "buildings." If the dictionary is of type USH, then morphological rules must always be applied to input words to generate all possible forms. For example, in such a dictionary, the entry for the verb "build" could be only found from the input word "building" by applying the morphological rule that generates "build" from "building," since a USH dictionary would only contain definitions for the noun "building" in the entry with keys "building." --.

Signed and Sealed this

Eleventh Day of September, 2001

Attest:

NICHOLAS P. GODICI
Attesting Officer
Acting Director of the United States Patent and Trademark Office